(12) United States Patent
Chen et al.

(10) Patent No.: US 12,296,994 B2
(45) Date of Patent: May 13, 2025

(54) UNMANNED VEHICLE HAVING FLIGHT CONFIGURATION AND SURFACE TRAVERSE CONFIGURATION

(71) Applicants: The Curators of the University of Missouri, Columbia, MO (US); The Hong Kong Polytechnic University, Kowloon (HK)

(72) Inventors: Genda Chen, Rolla, MO (US); Alec Reven, Newburg, MO (US); Bo Shang, Rolla, MO (US); Zhenhua Shi, Rolla, MO (US); Liujun Li, Rolla, MO (US); Boyang Li, Kowloon (HK)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 18/370,772

(22) Filed: Sep. 20, 2023

(65) Prior Publication Data

US 2024/0101284 A1 Mar. 28, 2024

Related U.S. Application Data

(60) Provisional application No. 63/409,522, filed on Sep. 23, 2022.

(51) Int. Cl.
*B64U 10/70* (2023.01)
*B64U 50/19* (2023.01)

(52) U.S. Cl.
CPC ............. *B64U 10/70* (2023.01); *B64U 50/19* (2023.01)

(58) Field of Classification Search
CPC ........ B64U 10/70; B64U 50/19; B64U 30/20; B61B 13/08; B61B 3/02; B61B 1/005; Y02T 30/00
See application file for complete search history.

(56) References Cited

U.S. PATENT DOCUMENTS 7,232,092 B2 * 6/2007 Yamamoto ............. B64G 1/002
244/63
9,937,808 B2 * 4/2018 Evans ..................... B60L 53/36
(Continued)

FOREIGN PATENT DOCUMENTS

| AU | 2016102409 A4 | 5/2019 |
|---|---|---|
| JP | 2018108818 A | 7/2018 |

(Continued)

OTHER PUBLICATIONS

Ehrhard, "Chen receives international 2019 Person of the Year award", News Article, Missouri S T, Oct. 3, 2019, accessed online at URL: https://news.mst.edu/2019/10/chen-receives-international-2019-person-of-the-year-award/.

(Continued)

*Primary Examiner* — Medhat Badawi
(74) *Attorney, Agent, or Firm* — Armstrong Teasdale LLP

(57) ABSTRACT

An unmanned vehicle includes a body, at least one power source coupled to the body, a flight propulsion system coupled to the at least one power source and configured to propel the unmanned vehicle through air, and a surface propulsion system coupled to the at least one power source and configured to propel the unmanned vehicle along a surface. The unmanned vehicle is configured to switch between a flight configuration in which the unmanned vehicle is propelled through air via the flight propulsion system, and a surface traverse configuration in which the unmanned vehicle is propelled along the surface via the surface propulsion system. In the surface traverse configuration, the surface propulsion system is configured to engage the surface and to maintain the body in a traversing position below the surface as the surface propulsion system propels the unmanned vehicle along the surface.

18 Claims, 17 Drawing Sheets

(56) References Cited

U.S. PATENT DOCUMENTS

| | | | | |
|---|---|---|---|---|
| 10,112,728 | B2* | 10/2018 | Evans | B64U 50/35 |
| 10,836,406 | B2* | 11/2020 | Lum | B61B 13/08 |
| 11,390,470 | B1* | 7/2022 | Cooley | B61B 9/00 |
| 11,565,884 | B1* | 1/2023 | Cooley | B65G 19/282 |
| 11,827,249 | B2* | 11/2023 | Cooley | B61B 13/10 |
| 12,080,907 | B2* | 9/2024 | Bell | H01M 50/296 |
| 12,100,853 | B2* | 9/2024 | Gil | B64U 60/00 |
| 2010/0307290 | A1* | 12/2010 | Porfiropoulos | F03G 3/00 74/84 R |
| 2016/0068264 | A1* | 3/2016 | Ganesh | G06Q 30/0641 701/4 |
| 2016/0140851 | A1* | 5/2016 | Levy | G08G 5/0069 701/410 |
| 2016/0347450 | A1* | 12/2016 | Raniere | B64U 50/35 |
| 2017/0015415 | A1* | 1/2017 | Chan | G06Q 30/04 |
| 2017/0160735 | A1* | 6/2017 | Mikan | B64U 80/25 |
| 2017/0162059 | A1* | 6/2017 | Jarrell | G06Q 50/40 |
| 2019/0144007 | A1* | 5/2019 | Lum | B64U 80/10 105/150 |
| 2020/0052512 | A1* | 2/2020 | Farrahi Moghaddam | B64U 10/14 |
| 2020/0143718 | A1* | 5/2020 | Salem | B60L 53/68 |
| 2021/0239434 | A1* | 8/2021 | Gury | G05D 1/12 |
| 2023/0091883 | A1* | 3/2023 | Kim | B64D 47/08 244/189 |
| 2024/0017854 | A1* | 1/2024 | Deng | B64U 20/75 |
| 2024/0101284 | A1* | 3/2024 | Chen | B64U 30/20 |

FOREIGN PATENT DOCUMENTS

| | | |
|---|---|---|
| JP | 2019177867 A | 10/2019 |
| JP | 2020133269 A | 8/2020 |
| KR | 102399998 B1 | 5/2022 |
| WO | 2023108210 A1 | 6/2023 |

OTHER PUBLICATIONS

Hickman, "Missouri S&T pioneering research in robotic bridge inspection-repair", News Article, KY3, Mar. 20, 2019, accessed online at URL: https://www.ky3.com/content/news/Missouri-ST-pioneering-studies-in-robotic-bridge-inspection-repair-507435921.html.

La, "Climbing Robots with Automated Deployment of Sensors and NDE Devices for Steel Bridge Inspection", Presentation, Inspire-UTC 2018 Annual Meeting, Aug. 14, 2018.

Meiri et al., "Flying Star, a Hybrid Crawling and Flying Sprawl Tuned Robot," 2019 International Conference on Robotics and Automation (ICRA), Montreal, QC, Canada, 2019, pp. 5302-5308, doi: 10.1109/ICRA.2019.8794260.

Reven et al., "Unmanned Aerial and Traversing Robot as Mobile Platform for Bridge Inspections", 9th International Conference on Structural Health Monitoring of Intelligent Infrastructure, Aug. 4-7, 2019, St. Louis, MO.

Shang et al., "Bridge Inspection Robot Deployment Systems (BIRDS)", Presentation Video, Inspire-UTC 2021 Annual Meeting, Aug. 10, 2021, accessed online at URL: https://scholarsmine.mst.edu/inspire-meetings/2021_meeting/autonomous_systems/1/.

Shang et al., "Bridge Inspection Robot Deployment Systems (BIRDS)", Presentation, Inspire-UTC 2020 Annual Meeting, Aug. 3, 2020.

Xaio, "Autonomous Wall-climbing Robots for Inspection and Maintenance of Concrete Bridges", Presentation, Inspire-UTC 2018 Annual Meeting, Aug. 14, 2018.

Xaio, "Autonomous Wall-Climbing Robots for Inspection and Maintenance of Concrete Bridges", Presentation, Inspire-UTC 2020 Annual Meeting, Aug. 3, 2020.

"2021 Infrastructure Report Card", American Society of Civil Engineers, archived on Sep. 22, 2022 at URL: https://web.archive.org/web/20220922133259/https://infrastructurereportcard.org/.

"The Naviator", Webpage, SubUAS LLC, archived on Aug. 19, 2022 at URL: https://web.archive.org/web/20220819090352/https://thenaviator.com/the-naviator.

Kubota, "A team of engineers create a perching bird-like robot", Web Article, dated Dec. 5, 2021, accessed online at URL: https://engineering.stanford.edu/magazine/team-engineers-create-perching-bird-robot.

"SCAMP: The Stanford Climbing and Aerial Maneuvering Platform", Webpage, archived on Aug. 1, 2019 at URL: http://web.archive.org/web/20190801005359/http://bdml.stanford.edu:80/Main/SCAMP.

\* cited by examiner

UNMANNED VEHICLE HAVING FLIGHT CONFIGURATION AND SURFACE TRAVERSE CONFIGURATION

CROSS-REFERENCE TO RELATED APPLICATIONS

This application claims priority to U.S. Provisional Patent Application Ser. No. 63/409,522, filed on Sep. 23, 2022, the content of which is hereby incorporated by reference in its entirety.

STATEMENT REGARDING FEDERALLY SPONSORED RESEARCH & DEVELOPMENT

This invention was made with government support under 69A3551747126 awarded by the U.S. Department of Transportation, Office of the Assistance Secretary for Research and Technology. The government has certain rights in the invention.

BACKGROUND OF THE DISCLOSURE

The field of the disclosure relates generally to unmanned vehicles and, more particularly, to an unmanned vehicle that has a flight configuration and a surface traverse configuration.

To ensure safety of users, infrastructure, such as bridges, are routinely inspected to determine necessary maintenance and repair and detect any signs of potential failure. However, conventional infrastructure inspection methods (e.g., human inspection) are expensive, may require the construction of inspection platforms, and may involve a risk of injuries for human inspectors and other people. In addition, use of the infrastructure may be restricted or closed during the inspection period, which may take hours or even days for some conventional inspection methods. For example, inspections of traffic bridges using conventional methods may require that one or more lanes of traffic be closed, which may lead to traffic congestion, and is a safety concern for both travelers and human inspectors. Further, visual inspection by a human inspector can be subjective and often inconsistent.

Unmanned vehicles have been increasingly used for infrastructure inspection. For example, unmanned vehicles may be used to inspect areas of infrastructure having few or no obstacles. However, conventional unmanned vehicles are not equipped for inspecting a wide variety of specialized areas, such as I-shaped beams or girders. For example, conventional unmanned vehicles may have an insufficient footprint, inappropriate orientation, or an inadequate surface propulsion system to safely traverse and transition between all surfaces of infrastructure. In addition, the unmanned vehicles may not have adequate power systems to complete an inspection of infrastructure. For example, the flight propulsion systems of conventional unmanned vehicles often consumes energy too fast and can only provide limited flying and operation time for completing an inspection of infrastructure.

Accordingly, there is a need for an unmanned vehicle for inspecting infrastructure that overcomes the limitations of current infrastructure inspection capabilities.

BRIEF DESCRIPTION OF THE DISCLOSURE

In one aspect, an unmanned vehicle is described. The unmanned vehicle includes a body, at least one power source coupled to the body, a flight propulsion system coupled to the at least one power source and configured to propel the unmanned vehicle through air, and a surface propulsion system coupled to the at least one power source and configured to propel the unmanned vehicle along a surface. The unmanned vehicle is configured to switch between a flight configuration in which the unmanned vehicle is propelled through air via the flight propulsion system, and a surface traverse configuration in which the unmanned vehicle is propelled along the surface via the surface propulsion system. In the surface traverse configuration, the surface propulsion system is configured to engage the surface and to maintain the body in a traversing position below the surface as the surface propulsion system propels the unmanned vehicle along the surface.

In another aspect, a system is described. The system includes an unmanned vehicle. The unmanned vehicle includes a body, at least one power source coupled to the body, a flight propulsion system coupled to the at least one power source and configured to propel the unmanned vehicle through air, and a surface propulsion system coupled to the at least one power source and configured to propel the unmanned vehicle along a surface. The system also includes a controller configured to send instructions to the unmanned vehicle to cause the unmanned vehicle to switch between a flight configuration in which the unmanned vehicle is propelled through air via the flight propulsion system and a surface traverse configuration in which the unmanned vehicle traverses the surface via the surface propulsion system. In the surface traverse configuration, the surface propulsion system is configured to engage the surface and maintain the body in a traversing position below the surface as the surface propulsion system propels the unmanned vehicle along the surface.

In yet another aspect, a method of operating an unmanned vehicle is described. The unmanned vehicle includes a body and at least one power source coupled to the body. The method includes propelling the unmanned vehicle through air using a flight propulsion system coupled to the at least one power source and engaging a surface with a plurality of drive mechanisms. The plurality of drive mechanisms are configured to engage the surface and maintain the body in a traversing position below the surface. The method also includes switching the unmanned vehicle between a flight configuration and a surface traverse configuration and propelling the unmanned vehicle along the surface in the traversing position using a surface propulsion system coupled to the at least one power source.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

DETAILED DESCRIPTION OF THE DISCLOSURE

In this disclosure, a system including an unmanned vehicle for inspecting infrastructure and methods for operating the unmanned vehicle are described. The unmanned vehicle may be able to switch between a flight configuration, in which the unmanned vehicle is propelled through air via a flight propulsion system, and a surface traverse configuration, in which the unmanned vehicle is propelled along a surface via a surface propulsion system. In the surface traverse configuration, the unmanned vehicle can traverse surfaces (e.g., surfaces of bridges or other infrastructure) and conduct inspection operations via sensors included on the unmanned vehicle. When in the flight configuration, the unmanned vehicle can fly to an inspection area and/or around obstacles.

The unmanned vehicle may provide enhanced inspection capabilities in comparison to known unmanned vehicles for conducting infrastructure inspections. For example, the unmanned vehicle may be able to engage and traverse a wide variety of surfaces and avoid obstacles encountered while inspecting an infrastructure surface. In addition, the unmanned vehicle may inspect surfaces for a greater length of time because the unmanned vehicle can conserve power by shutting down the flight propulsion system when traversing a surface.

Figure 3:
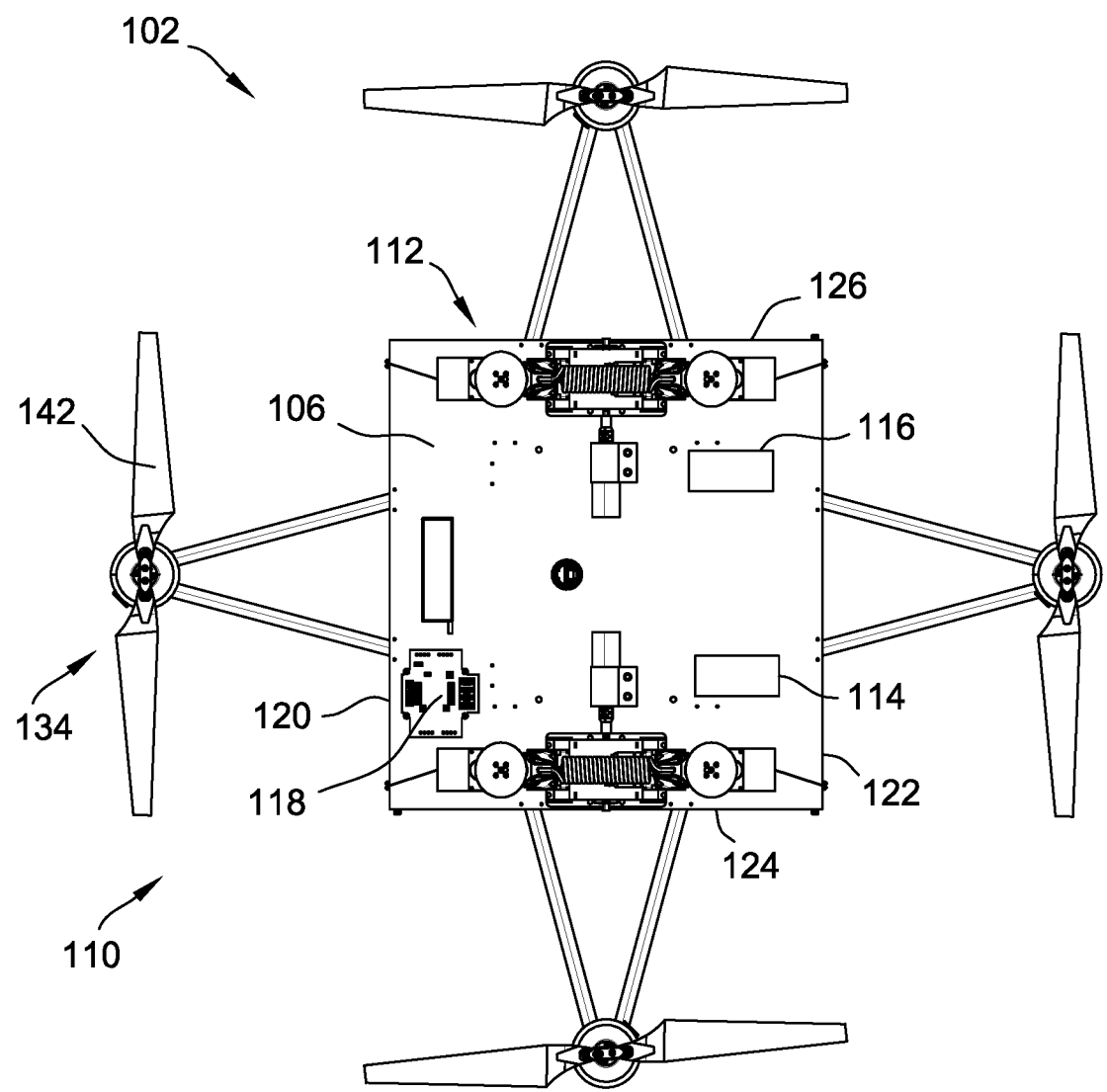
FIG. 3 is a top view of the unmanned vehicle shown in FIG. 2.
Figure 4:
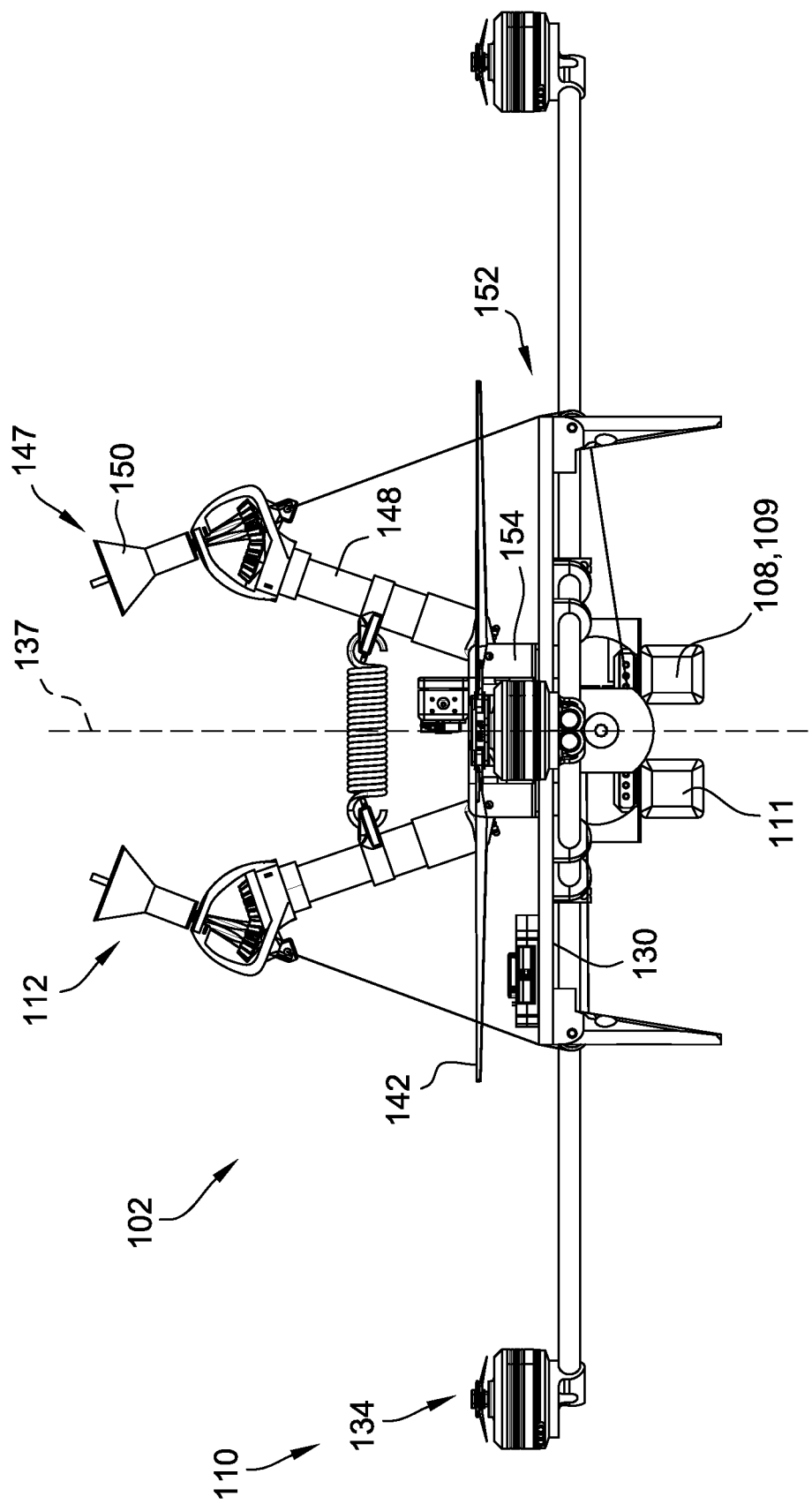
FIG. 4 is a side view of the unmanned vehicle shown in FIG. 2.
Figure 5:
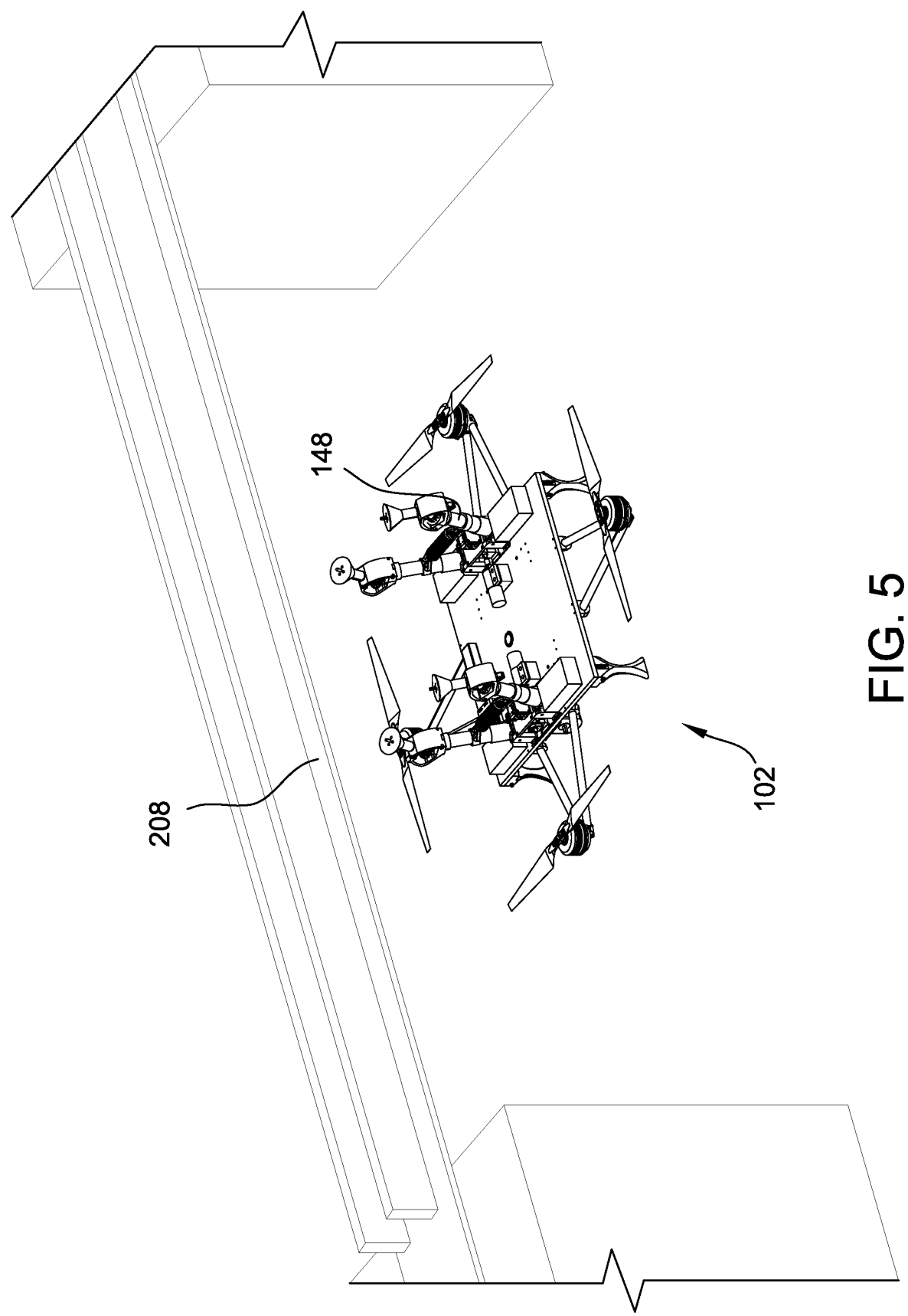
FIG. 5 is a perspective view of the unmanned vehicle shown in FIG. 2 hovering beneath a surface.
Figure 6:
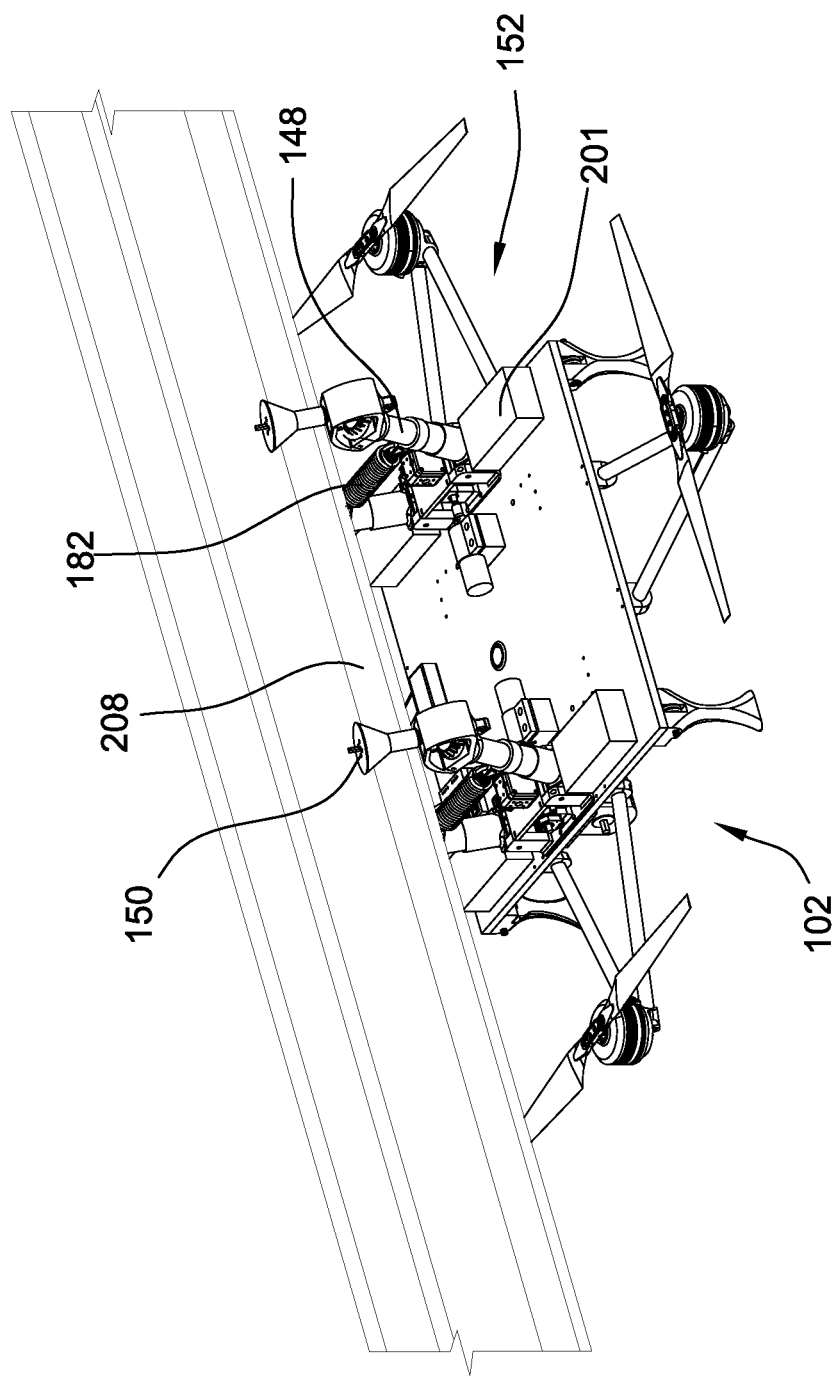
FIG. 6 is a perspective view of the unmanned vehicle shown in FIG. 2 engaging a surface.

As used herein, "vertical" or the "vertical direction" refers to a direction that is up and down, with reference to, for example, FIGS. 4-6. The vertical direction is the direction that gravity acts on an object. For example, a flying object counteracts gravity forces with a thrust force in an upward vertical direction. Further, as used herein, "horizontal" or the "horizontal direction" refers to a direction that is perpendicular to the vertical direction (e.g., left and right relative to the view shown in FIG. 3).

Figure 1:
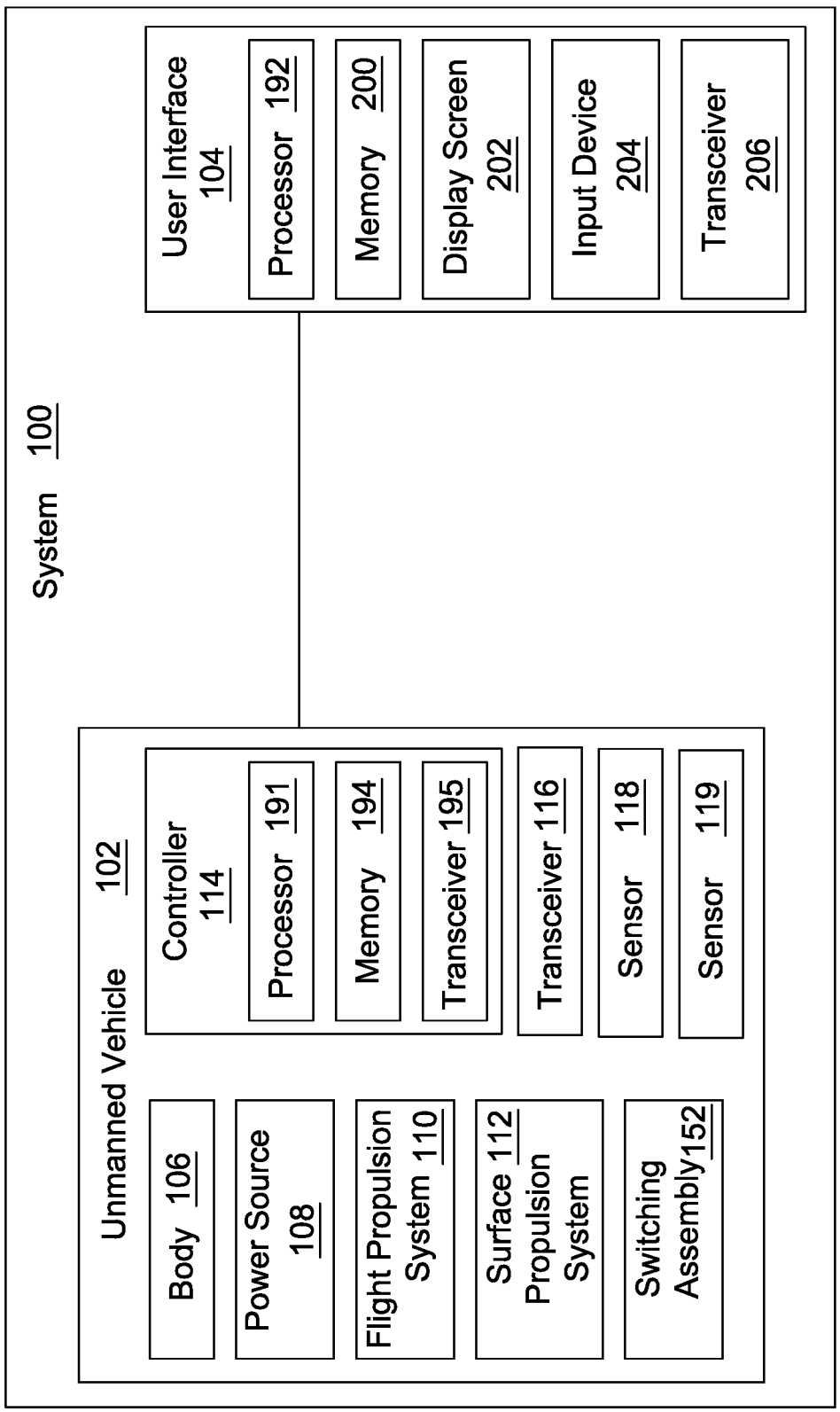
FIG. 1 is a schematic block diagram showing an example system including an unmanned vehicle.

FIG. 1 is a schematic diagram system showing an example layout of a system 100. The system 100 includes an unmanned vehicle 102 and a user interface 104. The unmanned vehicle 102 includes a body 106 and at least one power source 108 coupled to the body 106, a flight propulsion system 110 configured to propel the unmanned vehicle through air, a surface propulsion system 112 configured to propel the unmanned vehicle 102 along a surface, and a controller 114. The unmanned vehicle 102 is configured to switch between a flight configuration (e.g., shown in FIG. 2) in which the unmanned vehicle 102 is propelled through air via the flight propulsion system 110, and a surface traverse configuration (e.g., shown in FIG. 5) in which the unmanned vehicle 102 is propelled along a surface (e.g., a surface 208 shown in FIG. 5) via the surface propulsion system 112. The controller 114 is configured to control the unmanned vehicle 102 to cause the unmanned vehicle 102 to switch between the flight configuration and the surface traverse configuration. In some embodiments, flight propulsion system 110 and the surface propulsion system 112 are controllable via manual control by a user or via, at least partially, autonomous control.

The unmanned vehicle 102 also includes a sensor array including at least one sensor 118. The at least one sensor 118 may be used to collect information during an inspection operation and/or to detect obstacles when the unmanned vehicle 102 is traversing a surface or flying through the air. In addition, the at least one sensor 118 may be used to detect characteristics of the surface and/or a distance between the unmanned vehicle 102 and the surface. The controller 114 may control operation of the unmanned vehicle 102 based at least in part on information received from the sensor array. For example, the controller 114 may switch the unmanned vehicle 102 between the flight configuration and the surface traverse configuration when information from the at least one sensor 118 indicates the unmanned vehicle 102 is proximate to or engaged with the surface.

In the example, the unmanned vehicle 102 includes at least one transceiver 116 to facilitate communication between the unmanned vehicle 102 and one or more other components of the system 100 (e.g., the user interface 104). Accordingly, components such as the user interface 104 may be located remotely from or at least partly offboard of the unmanned vehicle 102. For example, the user interface 104 may be included on a computing device located remotely from the unmanned vehicle 102. The unmanned vehicle 102 may have reduced power requirements and may be lighter when components are located remotely from the unmanned vehicle 102. In some embodiments, the user interface 104 is located at least partly onboard the unmanned vehicle 102.

Figure 2:
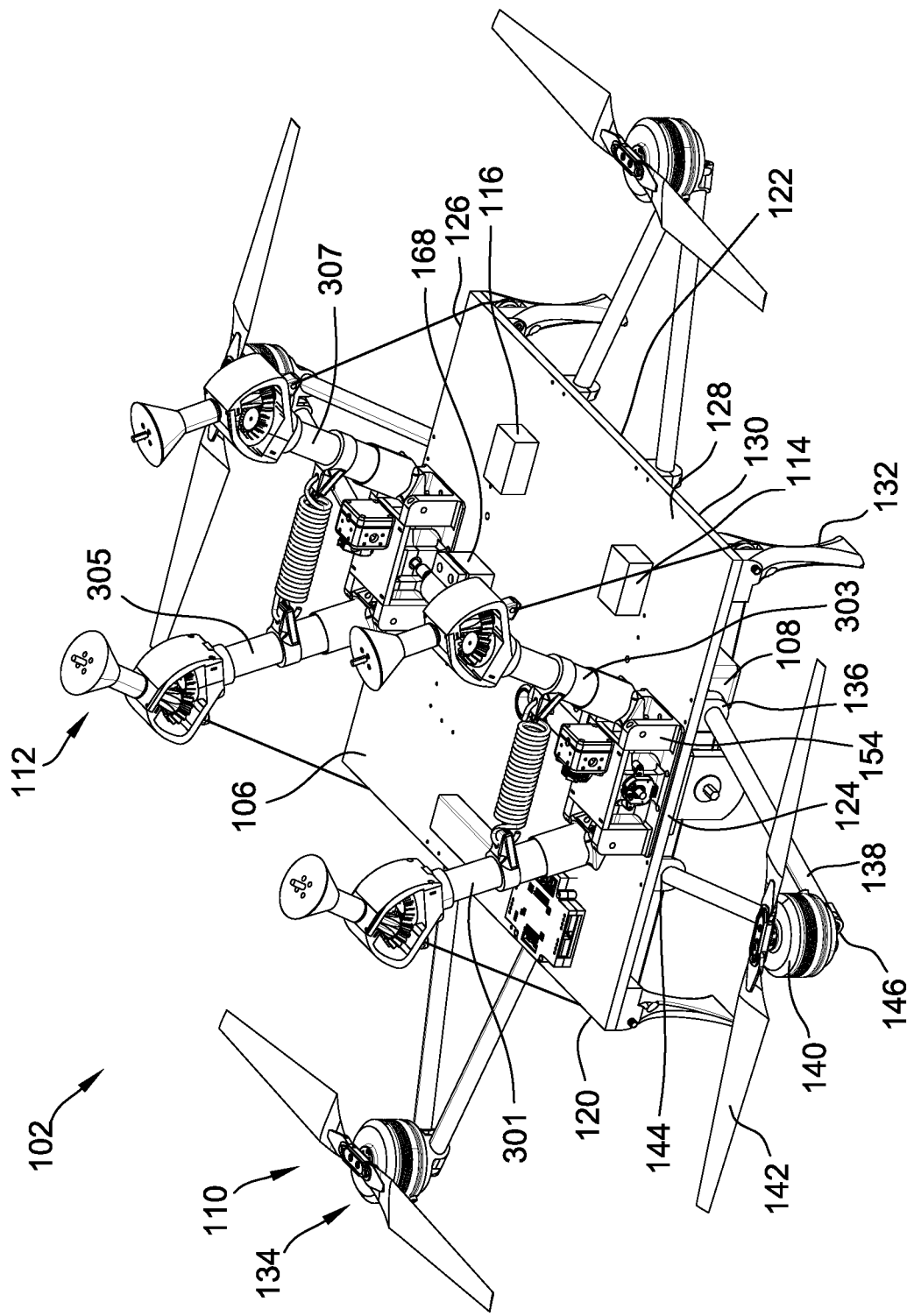
FIG. 2 is an isometric view of an example of the unmanned vehicle shown in FIG. 1.

FIG. 2 is an isometric view of an example of the unmanned vehicle 102. As shown in FIGS. 2-4, the body 106 of the unmanned vehicle 102 includes a first side 120, a second side 122, a first end 124, a second end 126, a top surface 128, and a bottom surface 130. The unmanned vehicle 102 also includes a plurality of feet 132 attached to and extending from the bottom surface 130 of the body 106. The feet 132 may be movable relative to the body 106 (e.g., movable between deployed and stowed positions) or fixed in position. The feet 132 facilitate the unmanned vehicle landing or resting on a surface and protect components on the bottom surface 130 of the body 106 from damage.

The unmanned vehicle 102 further includes the at least one power source 108. The power source 108 is mounted to the bottom surface 130 of the body 106 and is coupled to and configured to provide power to the flight propulsion system 110, the surface propulsion system 112, and/or other components of the unmanned vehicle 102 via at least one wire connected to the power source 108. In some embodiments, the at least one power source 108 may be coupled to any surface of the body 106 (e.g., the top surface 128 or the bottom surface 130) and/or any other component of the unmanned vehicle 102. The at least one power source 108 may include, for example, a battery or any other suitable power source that enables the unmanned vehicle 102 to function as described herein.

In the example, the unmanned vehicle 102 includes two power sources 108 (e.g., a first battery 109 and a second battery 111). The first battery 109 is connected to and provides power for operation of the flight propulsion system 110. The second battery 111 is connected to and provides power for operation of the surface propulsion system 112. In other embodiments, the flight propulsion system 110 may be powered by multiple batteries 109, 111, and the surface propulsion system 112 may be powered by the same or a subset of the multiple batteries 109, 111 and/or by a separate battery. That is, in some embodiments, the unmanned vehicle 102 may include one, two, three, or more batteries to power the flight propulsion system 110, the surface propulsion system 112, and/or any other components of the unmanned vehicle 102.

As shown in FIGS. 2 and 3, the flight propulsion system 110 is coupled to the body 106, and includes at least one flight propulsion assembly 134. Each flight propulsion assembly 134 includes brackets 136, booms 138, a motor 140, and a flight propulsion device 142. The booms each 138 extend from a respective first end 144 to a respective second end 146. In the example, the booms 138 are each mounted to the body 106 via one of the brackets 136 at the first end 144 of the respective boom 138. The booms 138 are oriented to extend horizontally outward from the sides 120, 122, and the ends 124, 126 of the body 106 and support the motors 140. The second ends 146 of the booms 138 of each flight propulsion assembly 134 are connected together. One motor 140 of each flight propulsion assembly 134 is coupled to the corresponding booms 138 at the second end 146 of the booms 138. In some embodiments, each flight propulsion assembly 134 may include more than one motor 140 and/or more than two booms 138.

The flight propulsion device 142 of each flight propulsion assembly 134 is operably coupled to the corresponding motor 140 such that the motor 140 powers the flight propulsion device 142. The flight propulsion system 110 is operable to propel the unmanned vehicle 102 through air. For example, the motor 140 of each flight propulsion assembly 134 is drivingly attached to the flight propulsion device 142 of each respective flight propulsion assembly 134, and the flight propulsion device 142 of each flight propulsion assembly 134 produces a lift or thrust force to raise the unmanned vehicle 102 in the air and to move and turn the unmanned vehicle 102 as desired. For example, in one embodiment, the flight propulsion device 142 is a propeller, and the motor 140 of each flight propulsion assembly 134 provides a drive force to a respective shaft that is connected to the corresponding propeller, thereby rotating the propeller and powering the flight propulsion system 110.

In the example, the flight propulsion system 110 includes four flight propulsion assemblies 134. The controller 114 sends instructions to the flight propulsion assemblies 134 to operate the flight propulsion devices 142 and propel the unmanned vehicle 102 through the air in desired directions. That is, the four flight propulsion assemblies 134 work together to facilitate maneuverability of the unmanned vehicle 102 when the unmanned vehicle 102 is propelled through the air. For example, if more power is provided to the flight propulsion assembly 134 mounted to the first end 124 of the body 106 than to the remaining flight propulsion assemblies 134, and if a same, lower amount of power is provided to the remaining flight propulsion assemblies 134, then the unmanned vehicle 102 will tilt such that the first end 124 of the unmanned vehicle 102 is higher than the second end 126 of the unmanned vehicle, and the unmanned vehicle will fly in a direction extending between the first and second ends 124, 126 of the unmanned vehicle 102. In another example, the flight propulsion assemblies 134 may be powered such that the unmanned vehicle 102 moves vertically up or down (or may be powered such that the unmanned vehicle 102 hovers in place) by powering all flight propulsion assemblies 134 equally. In yet another example, the flight propulsion assemblies 134 can rotate the unmanned vehicle about a central axis 137 of the body 106 by rotating the corresponding flight propulsion device 142 of specific flight propulsion assemblies 134 at different speeds (e.g., rotating the flight propulsion devices 142 that rotate in the same direction faster than the flight propulsion devices 142 that rotate in the opposite direction).

In the example, the flight propulsion device 142 of each flight propulsion assembly 134 is a propeller. In other embodiments, the flight propulsion system 110 may include other flight propulsion devices (e.g., a ducted fan jet) in combination with or in place of a propeller. In any embodiment, the flight propulsion system 110 may include any suitable number of flight propulsion assemblies 134 having any suitable configuration, including any suitable flight propulsion device 142, that enables the unmanned vehicle 102 to function as described herein.

Figure 7:
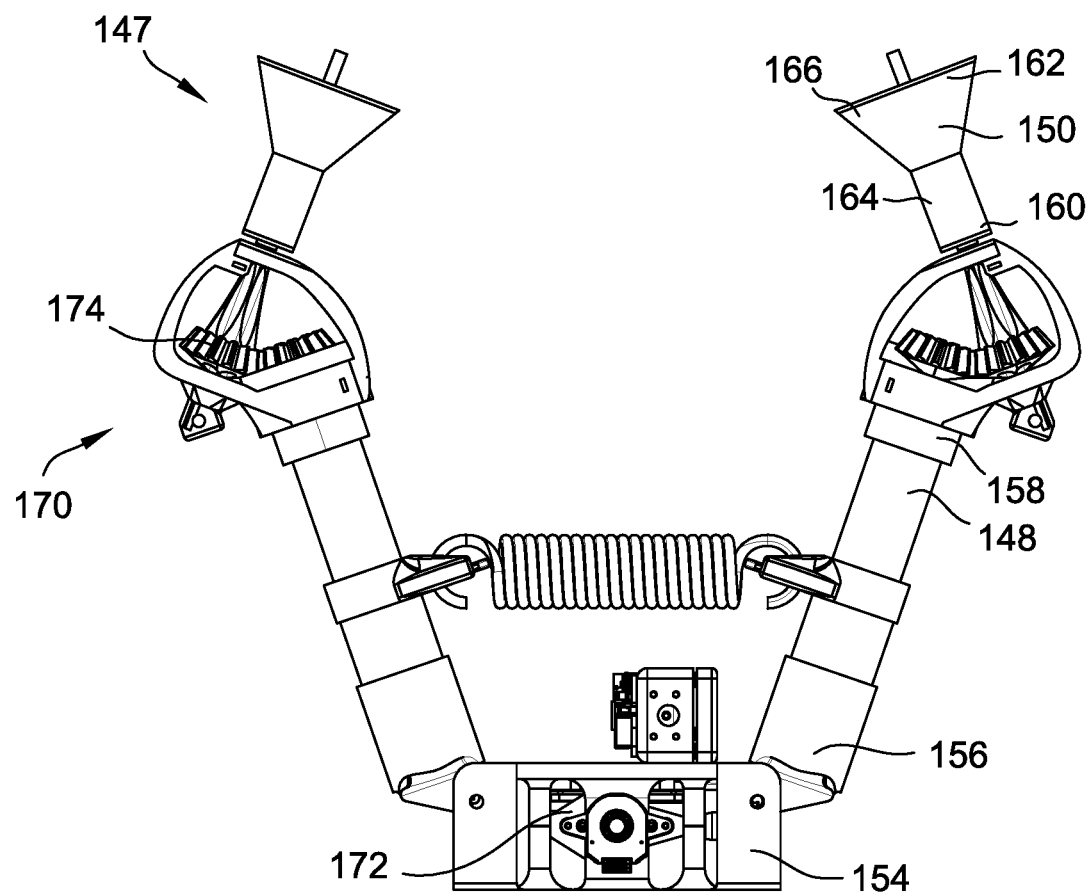
FIG. 7 is an end view of a portion of the unmanned vehicle shown in FIG. 2 illustrating the surface propulsion system of the unmanned vehicle.
Figure 8:
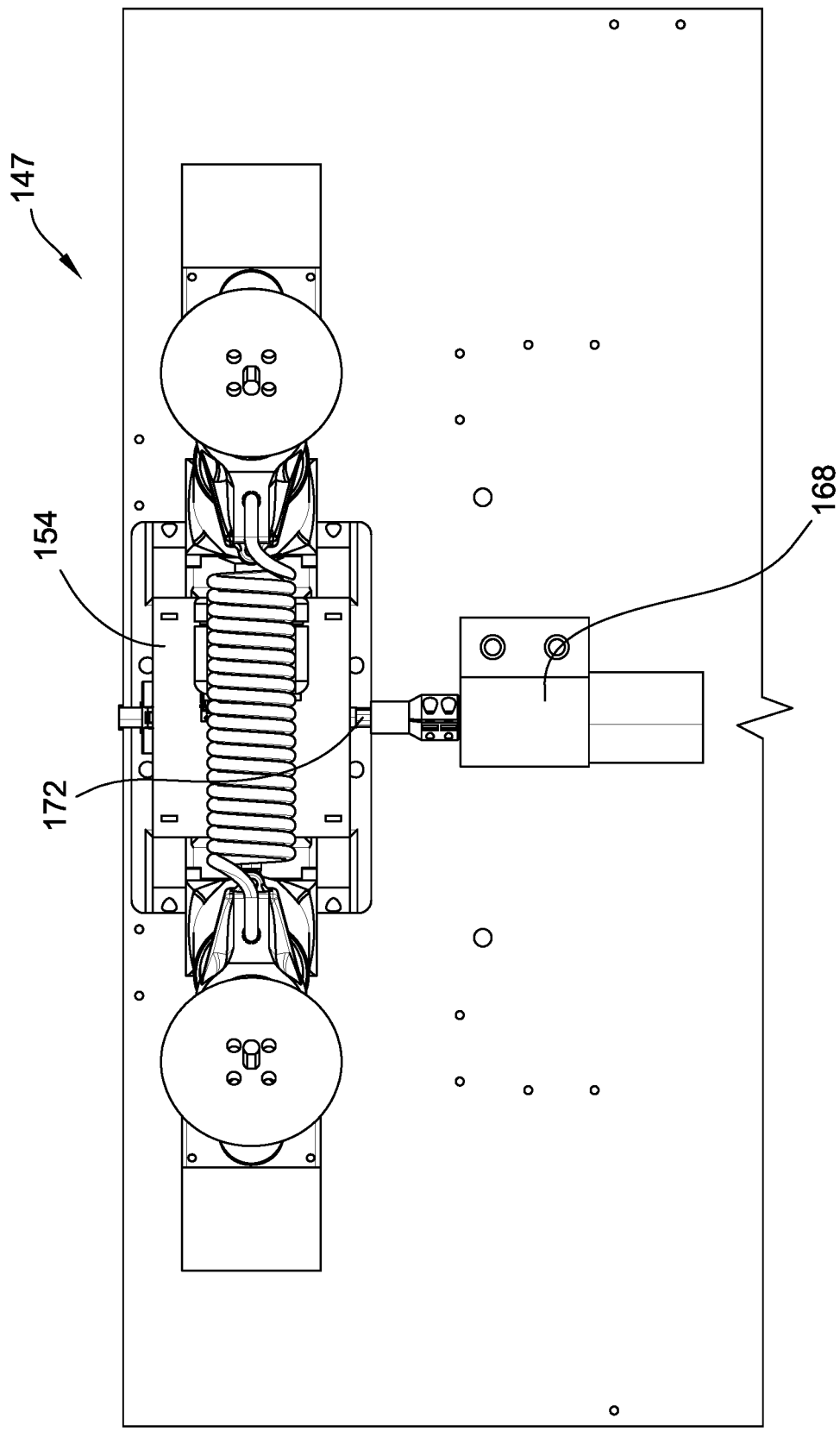
FIG. 8 is a top view of a portion of the unmanned vehicle shown in FIG. 2 illustrating a portion of the surface propulsion system.

With reference to FIGS. 4, 7, and 8, the surface propulsion system 112 includes a plurality of drive assemblies 147, a plurality of drive mechanisms 150, and at least one switching assembly 152. The drive assemblies 147 each include a plurality of arms 148 coupled to a bracket 154. The plurality of drive mechanisms 150 are operably coupled to the plurality of arms 148. The at least one switching assembly 152 (shown in further detail in FIGS. 9 and 10) is coupled to the plurality of arms 148 of each drive assembly 147.

With additional reference to FIG. 7, each arm 148 extends from a first end 156 to a second end 158. Each arm 148 is pivotably coupled to the body 106 via a bracket 154 coupled to the body 106 near the first end 156 of each arm 148. A separate drive mechanism 150 of the plurality of drive mechanisms 150 is coupled to the second end 158 of each respective arm 148. In the illustrated embodiment, two arms 148 are coupled to each bracket 154.

As described further herein, each arm 148 of the plurality of arms 148 is moveable between a first, open position (e.g., shown in FIG. 5) and a second, engaged position (e.g., shown in FIG. 6), or vice-versa, via the at least one switching assembly 152. The plurality of arms 148 selectively position the plurality of drive mechanisms 150 to engage a surface and to maintain the body 106 in the traversing position below the surface when each arm 148 of the plurality of arms 148 is moved to its second, engaged position via the at least one switching assembly 152. In the example, the plurality of arms includes a first arm 301, a second arm 303, a third arm 305, and a fourth arm 307 (FIG. 2). The first and second arms 301, 303 are paired up to grip a surface therebetween, and the third and fourth arms 305, 307 are paired up to grip a surface therebetween.

FIG. 5 illustrates the unmanned vehicle 102 hovering beneath a surface 208 in the flight configuration with the arms 148 in the first, open position, and FIG. 6 illustrates the unmanned vehicle 102 in the surface traverse configuration with the arms 148 in the second, engaged position and with the plurality of drive mechanisms 150 engaging the surface 208. During operation, when approaching a surface 208, the controller 114 sends instructions to cause the flight propulsion system 110 to move the body 106 vertically below the surface 208 (e.g., the bottom surface of an I-beam or girder of a bridge). When the body 106 is below the surface 208 and spaced a desired distance from the surface 208, the arms 148 are positioned adjacent to the surface in the first, open position. Then, the controller 114 executes instructions to actuate each arm 148 of the plurality of arms 148 to the respective second, engaged position, thereby enabling the plurality of drive mechanisms 150 to engage the surface 208 (e.g., as shown in FIG. 6). When the drive mechanisms 150 of the unmanned vehicle 102 have engaged the surface 208, the controller 114 executes instructions to shut down the flight propulsion system 110, and enables control of (e.g., powering on) the surface propulsion system 112. When the unmanned vehicle 102 is in the surface traverse configuration, the surface propulsion system 112 is configured to engage a surface and to maintain the body 106 in a traversing position below the surface as the surface propulsion system 112 propels the unmanned vehicle 102 along the surface. Operation of the unmanned vehicle 102 with respect to FIGS. 5 and 6 is further described herein.

With reference to FIG. 7, each drive mechanism 150 extends from a first end 160 to a second end 162, and each drive mechanism 150 includes a cylindrical portion 164 near the first end 160, and a tapered portion 166 near the second end 162. The cylindrical portion 164 has a constant radius over its length (e.g., along the direction defined between the first end 160 and the second end 162), and the tapered portion 166 has a variable radius over its length (e.g., along the direction defined between the first end 160 and the second end 162).

Specifically, the radius of the tapered portion 166 is smallest at a location where the cylindrical portion 164 meets the tapered portion 166 and is largest at the second end 162 of the drive mechanism 150. In the example shown in FIG. 7, the tapered portion 166 of each drive mechanism 150 is shaped like a portion of a cone. The tapered portion 166 of each drive mechanism 150 improves engagement of the drive mechanisms 150 with a surface by providing enhanced engagement with the surface and thus enhances grip on the surface. The configuration of the drive mechanisms 150 in combination with the actuating arms 148 enables the unmanned vehicle 102 to engage a wide variety of surfaces, thereby enabling compatibility of the unmanned vehicle 102 with a wide variety of structures (e.g., bridges, buildings, etc.). In the example, the unmanned vehicle 102 is configured for traversing and inspecting structures such as structural beams (e.g., bridge girders or I-beams) when in the surface traverse configuration. The configuration of the surface propulsion system 112 of the unmanned vehicle 102 facilitates the unmanned vehicle 102 effectively inspecting many types and configurations of structures.

In the example, the drive mechanisms 150 are constructed from a material having properties suitable for enhanced engagement with the surface, such as a polyurethane material. In other embodiments, the drive mechanisms 150 may have any suitable configuration and may be constructed from any suitable material that enables the unmanned vehicle 102 to function as described herein.

As shown in FIGS. 7 and 8, each drive assembly 147 further includes a motor 168 mounted to the body 106 and at least one transmission assembly 170. The motor 168 provides power to each drive mechanism 150 of the corresponding drive assembly 147 via the at least one transmission assembly 170. In the example, each drive assembly 147 includes two transmission assemblies 170 (one for each drive mechanism 150). In other embodiments, each drive assembly 147 may include any suitable number of transmission assemblies 170 that enable the unmanned vehicle 102 to function as described herein.

Each transmission assembly 170 is configured to transfer power from the corresponding motor 168 to the corresponding plurality of drive mechanisms 150 when the unmanned vehicle 102 is in the surface traverse configuration. Each transmission assembly 170 includes transmission shafts (not shown) within the arms 148, transmission gears 172 (FIG. 8) located within and near the bracket 154, and transmission gears 174 (FIG. 7) located near the second end 158 of each arm 148. The transmission shafts are operable to transfer mechanical power from the first end 156 to the second end 158 of each arm 148 of the corresponding drive assembly 147. The transmission gears 172 are drivingly connected to the motors 168 and connected to the shafts to cause rotation of the shafts when the motor 168 causes rotation of the transmission gears 172. The transmission gears 174 are drivingly connected to the shafts and are connected to the drive mechanisms 150 to cause rotation of the drive mechanisms 150 when the transmission gears 174 are rotated by the shafts.

During operation of the motor 168, power is transferred from the motor 168 to the transmission shaft of the corresponding transmission assembly 170 via transmission gears 172 located within or near the bracket 154. The transmission shafts transfer power to the drive mechanisms 150 near the second ends 158 of the arms 148 via transmission gears 174 located near the second end 158 of each arm 148.

In the example, the motors 140 are coupled to the flight propulsion system 110 and the motors 168 are coupled to the surface propulsion system 112. In some embodiments, the flight propulsion system 110 and the surface propulsion system 112 may share one or more motors 140, 168. For example, the flight propulsion system 110 and the surface propulsion system 112 may be powered by the same one or more motors 140, 168. In such embodiments, the flight propulsion system 110 and/or the surface propulsion system 112 may include at least one clutch assembly 145 (shown in FIG. 19).

Figure 19:
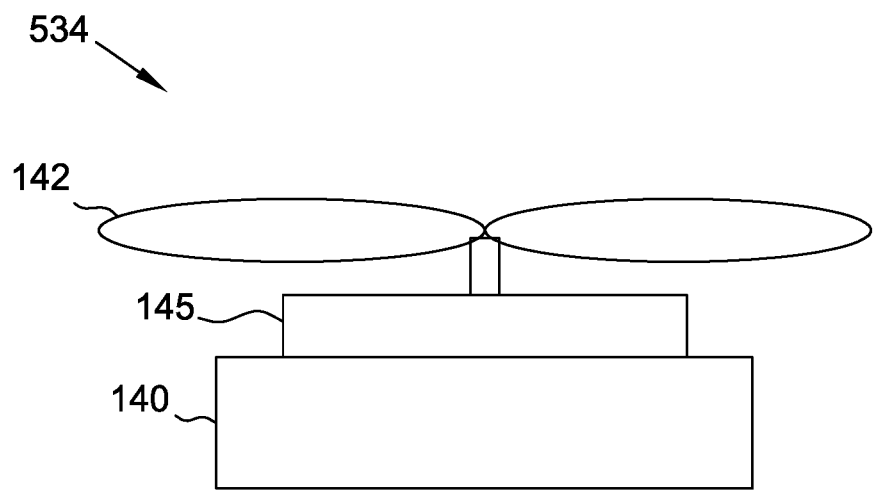
FIG. 19 is a schematic illustrating an example clutch assembly of the flight propulsion system of the unmanned vehicle shown in FIG. 2.

In some embodiments, and with reference to FIG. 19, the flight propulsion system 110 may include flight propulsion assemblies 534 in place of flight propulsion assemblies 134. The flight propulsion assemblies 534 are similar to the flight propulsion assemblies 134, but further include at least one clutch assembly 145. FIG. 19 illustrates a portion of an example flight propulsion assembly 534 that includes an example clutch assembly 145 coupled to the motor 140 and the flight propulsion device 142.

The at least one clutch assembly 145 is configured to selectively provide or prevent power from being transferred to the plurality of flight propulsion devices 142, for example, by selectively engaging or disengaging the motor 140 from the flight propulsion device 142. The clutch assembly 145 may be of any suitable configuration that enables the unmanned vehicle 102 to function as described herein. For example and without limitation, the at least one clutch assembly 145 may be a centrifugal clutch, a friction clutch, a semi-centrifugal clutch, a conical spring or diaphragm clutch, a positive clutch, a hydraulic clutch, an electromagnetic clutch, a vacuum clutch, or an overrunning clutch or freewheel unit. In some embodiments, the clutch assembly 145 may be similar to the clutch assembly 176 that is described further herein.

The at least one clutch assembly 145 may be positioned at any suitable location along a powertrain between the motor 140 and the flight propulsion device 142 of each flight propulsion assembly 534. For example, the clutch assembly 145 may be located directly between the motor 140 and the flight propulsion device 142 of each flight propulsion assembly 534 of the flight propulsion system 110 (e.g., as shown in FIG. 19). In any embodiment, the unmanned vehicle 102 may include any suitable number of clutch assemblies 145 positioned in any suitable location and having any suitable configuration that enables the unmanned vehicle 102 to function as described herein.

Figure 20:
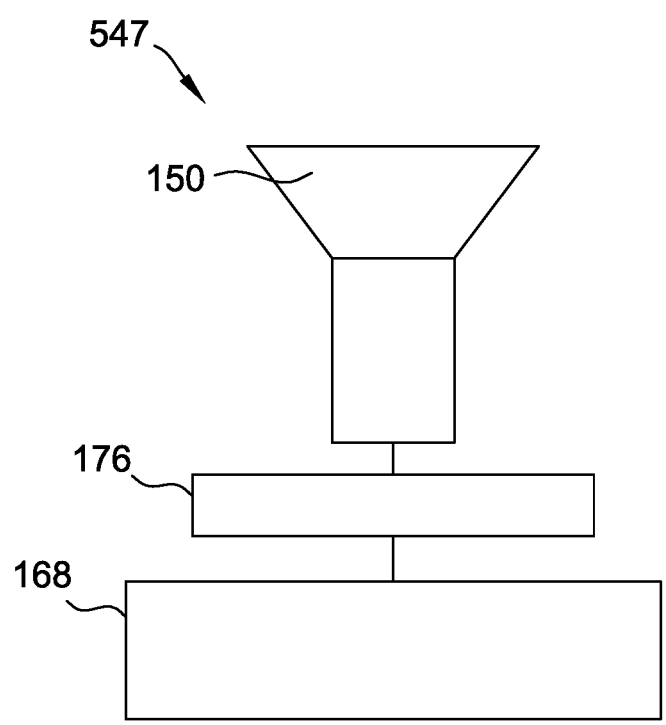
FIG. 20 is a schematic illustrating an example clutch assembly of the surface propulsion system of the unmanned vehicle shown in FIG. 2.

With reference to FIG. 20, in some embodiments, the surface propulsion system 112 may include drive assemblies 547 in place of drive assemblies 147. The drive assemblies 547 are similar to the drive assemblies 147, but further include at least one clutch assembly 176 configured to selectively provide power to the plurality of drive mechanisms 150 when the unmanned vehicle 102 is in the surface traverse configuration and to selectively prevent transmission of power to the plurality of drive mechanisms 150 when the unmanned vehicle 102 is in the flight configuration or when the unmanned vehicle 102 is switching between the flight configuration and the surface traverse configuration. The at least one clutch assembly 176 may be of any suitable configuration that enables the unmanned vehicle 102 to function as described herein. For example and without limitation, the at least one clutch assembly 176 may be a centrifugal clutch, a friction clutch, a semi-centrifugal clutch, a conical spring or diaphragm clutch, a positive clutch, a hydraulic clutch, an electromagnetic clutch, a vacuum clutch, or an overrunning clutch or freewheel unit.

In one example, the at least one clutch assembly 176 is a rotatable friction clutch that includes a rotatable housing, a shaft, a plurality of springs arranged radially about a central axis within the housing, and a plurality of clutch brakes corresponding to the plurality of springs. The plurality of springs are operatively coupled to the shaft and are configured to selectively bias the corresponding clutch brakes away from engagement with interior edges of the rotatable housing. The shaft is drivingly coupled to the motor such that the shaft rotates when power is supplied to the motor. As the rotation speed of the shaft increases, the clutch brakes displace radially outward and engage the interior edges of the rotatable housing. When the clutch brakes engage the interior edges of the rotatable housing, power from the shaft is transferred to the rotatable housing, thereby enabling mechanical power to be transferred through the clutch assembly 176. Disengagement of the clutch brakes from the interior surface of the rotatable housing disables mechanical power from being transferred through the clutch assembly 176.

The at least one clutch assembly 176 may be located at any suitable position along a powertrain between the motor 168 and the drive mechanisms 150 of the drive assemblies 547 of the surface propulsion system 112. An example configuration of a clutch assembly 176 located between the motor 168 and a drive mechanism 150 is shown in FIG. 20.

In the example, one clutch assembly 176 is located between the motor 168 and the transmission assemblies 170 of each drive assembly 547 of the surface propulsion system 112. In other embodiments, one clutch assembly 176 may be located between the transmission assemblies 170 and the drive mechanisms 150 of each drive assembly 547. In any embodiment, the unmanned vehicle 102 may include any suitable number of clutch assemblies 176 located in any suitable location and having any suitable configuration that enables the unmanned vehicle 102 to function as described herein.

Figure 9:
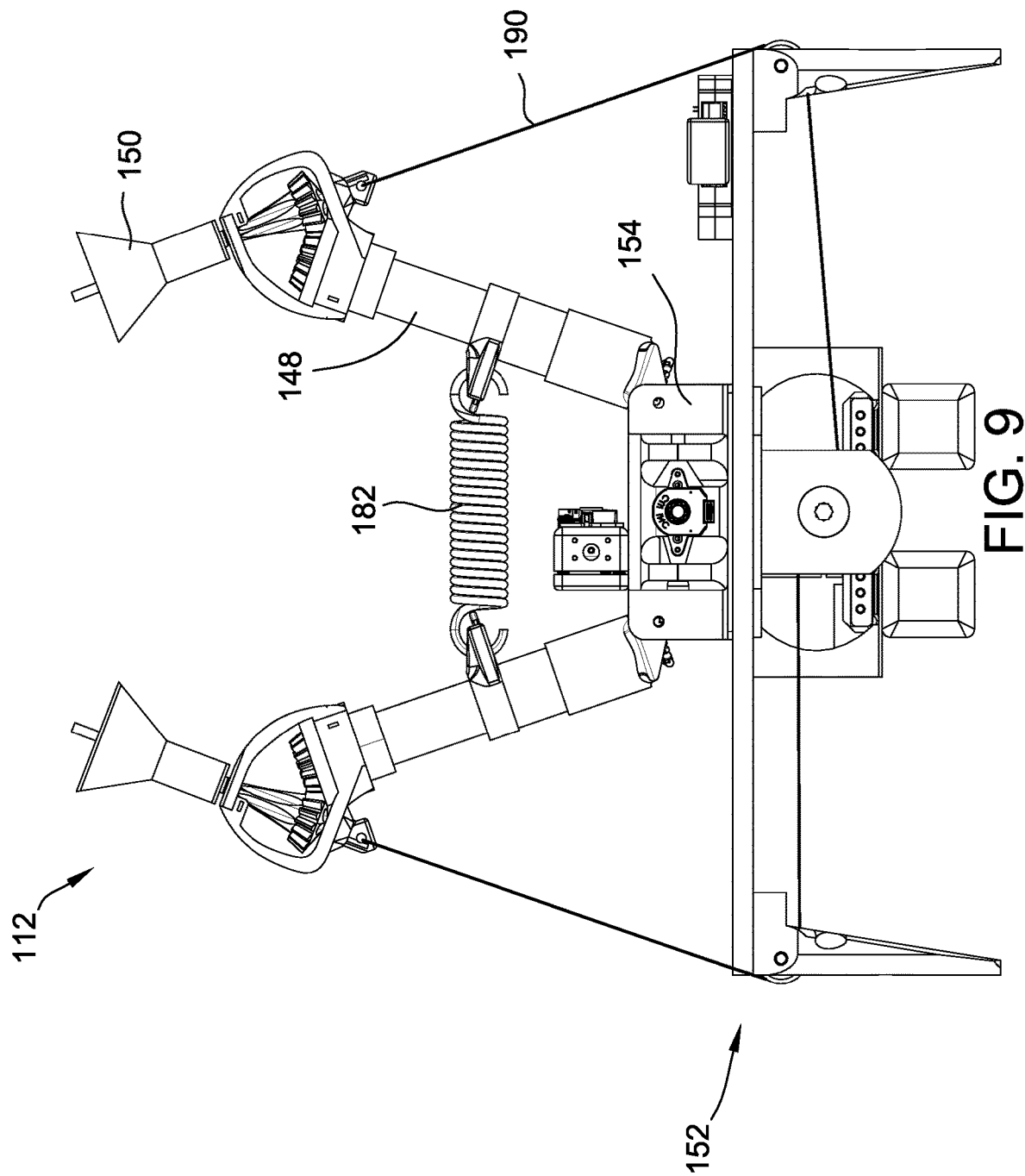
FIG. 9 is an end view of the unmanned vehicle shown in FIG. 2 showing two example switching assemblies.
Figure 10:
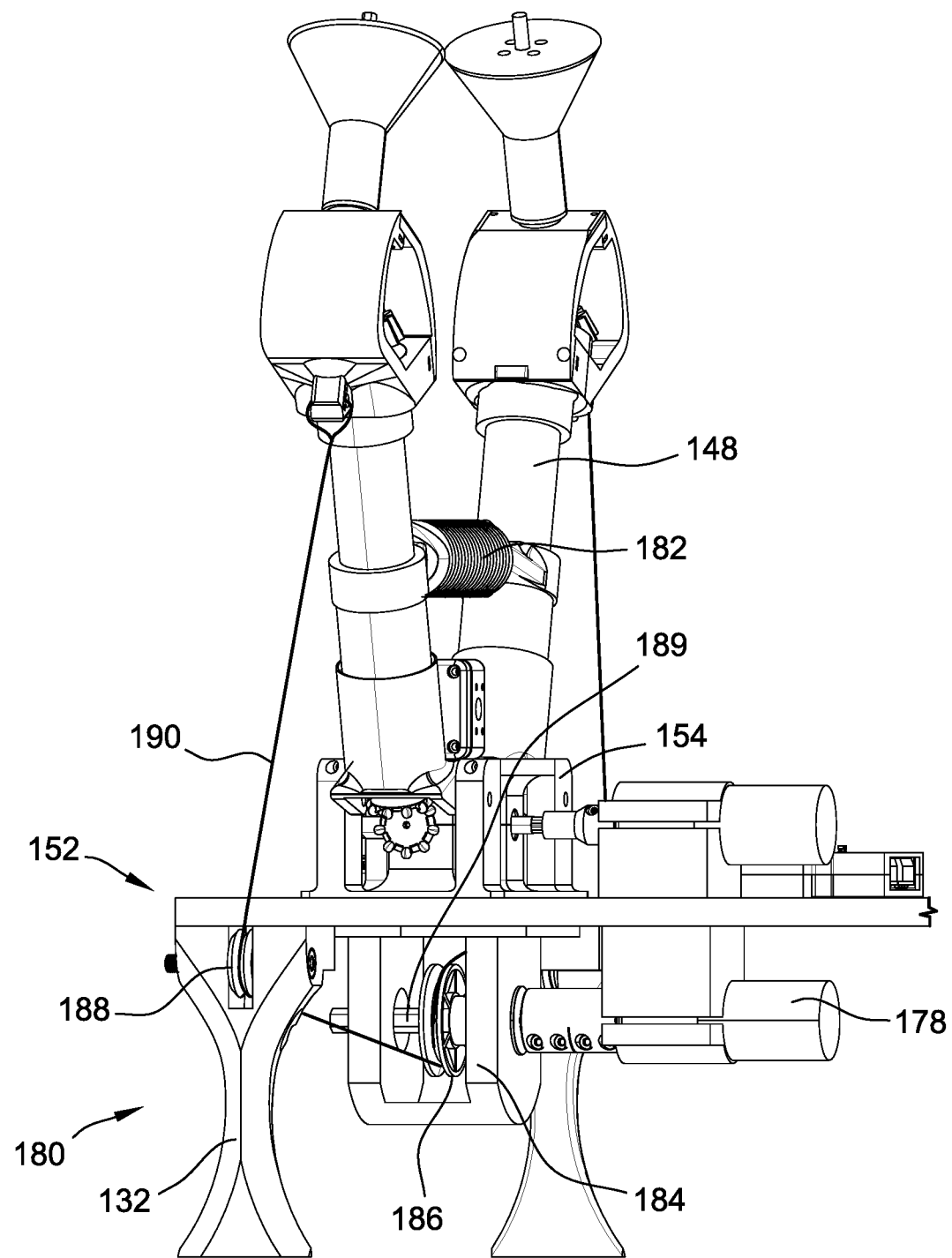
FIG. 10 is a perspective view of the example switching assemblies of the unmanned vehicle shown in FIG. 9, with the power source and electronics removed from the bottom of the unmanned vehicle.

FIGS. 9 and 10 show portions of the surface propulsion system 112, with other structure removed for clarity. Specifically, FIGS. 9 and 10 show components of the at least one switching assembly 152. Each switching assembly 152 is operable to move corresponding arms 148 between a second, engaged position (shown in FIG. 6) and a first, open position (shown in FIG. 5), and vice-versa. As shown in FIGS. 9 and 10, each switching assembly 152 includes a motor 178, at least one switching transmission 180, and the at least one bias member 182. In the example, the unmanned vehicle 102 includes two switching assemblies 152 that each include two switching transmissions 180. In other embodiments, the unmanned vehicle 102 may include one or more of the switching assemblies 152, and each switching assembly 152 may include one or more of the switching transmissions 180.

In the example, each switching transmission 180 includes a bracket 184, with a pulley 186 mounted to the bracket 184, at least one rotatable shaft 189, and a pulley 188 mounted to respective feet 132 of the unmanned vehicle 102. The pulley 186 is operably coupled to the corresponding motor 178 via the at least one rotatable shaft 189. In the example, one bracket 184, one shaft 189, and one pulley 186 are shared by two switching transmissions 180 (e.g., one pulley 186 is shared by two switching transmissions 180 that are operably coupled to corresponding arms 148). In some embodiments, each switching transmission 180 includes one or more brackets 184, one or more pulleys 186, and/or one or more shafts 189.

Within each switching transmission 180, a cable 190 is coupled to the pulley 186 at a first end, passes over the corresponding pulley 188, and is coupled to an arm 148 of the surface propulsion system 112. In the example, the cable 190 of each switching transmission 180 is coupled to opposing sides of the shared pulley 186. For example (with respect to the vertical, up and down, direction in FIG. 10), one cable 190 is coupled to the bottom of the pulley 186, and the other cable 190 is coupled to the top of the pulley 186. As the pulley 186 is wound by the motor 178, the cables 190 are wound around the pulley 186, thereby providing tension in the cables 190 that causes the arms 148 to move apart from each other.

In the example, one motor 178 provides power to each switching transmission 180 and each drive assembly 147 has two corresponding switching transmissions 180 (e.g., two switching transmissions 180 enable the arms 148 of each drive assembly 147 to move between the first and second positions). In other embodiments, the surface propulsion system 112 may include any suitable number of motors 178 and any suitable number of switching transmissions 180 having any suitable configuration that enable unmanned vehicle 102 to function as described herein. For example, in some embodiments, one or more of the arms 148 are stationary and the other arms 148 may be selectively positioned in an engaged position when the unmanned vehicle 102 engages a surface.

As shown in FIGS. 9 and 10, the bias member 182 is coupled to both arms 148 of the drive assembly 147. The bias member 182 is configured to bias each corresponding arm 148 of the plurality of arms 148 toward the second, engaged position. In the example, the bias member 182 is an extension spring. However, in other embodiments, the surface propulsion system 112 may include any suitable number of bias members having any suitable configuration that enables the unmanned vehicle 102 to function as described herein. In some embodiments, the surface propulsion system 112 includes a bias member other than the bias member 182 (e.g., an elastic chord).

Actuation of the switching assemblies 152 causes the arms 148 of the corresponding drive assemblies 147 to move from the second, engaged position, to the first, open position. For example, the switching assemblies 152 are operable to move the arms 148 of the corresponding drive assemblies 147 away from each other. During operation, actuation of each switching assembly 152 causes the corresponding motor 178 to turn in a first direction. As the motor 178 turns in the first direction, power is transferred to the pulley 186 via the rotatable shaft 189, causing the pulley 186 to turn. As the pulley 186 turns, a tensile force is applied to the cables 190. The tensile force applied to the cables 190 is transferred to the corresponding arms 148 via the pulleys 188 of the corresponding switching transmissions 180, and causes the corresponding arms 148 to move away from each other and into the first, open position. Specifically, actuation of the switching assemblies 152 causes the second ends 158 of the arms 148 of the corresponding drive assembly 147 to move away from each other by pivoting about their respective couplings to the bracket 154. Movement of the arms 148 away from each other causes each of the corresponding drive mechanisms 150 to move away from each other. Once the arms 148 are in the second, retracted position, power to the motor 178 is removed. In the example, the motor 178 is a gear motor, and thus the motor 178 holds the current position when power to the motor 178 is removed. Therefore, when power to the motor 178 is removed when the arms 148 are in the second, retracted position, the arms 148 stay in the second, retracted position.

When the motor 178 of each switching assembly 152 is turned in a second direction, opposite to the first direction, tension in the cables 190 is released, and each bias member 182 biases the arms 148 of the corresponding drive assembly 147 back toward one another (i.e., back toward the second, engaged position). Movement of the arms 148 of each drive assembly 147 toward each other causes each of the corresponding drive mechanisms 150 to move toward each other. When the unmanned vehicle 102 engages a surface in the surface traverse configuration, the bias member 182 helps to secure the unmanned vehicle 102 to the surface.

In the example, each switching assembly 152 includes one bias member 182 extending between and mounted to a pair of the arms 148. In other embodiments, each switching assembly may include any suitable number of bias members 182.

With reference to FIG. 1, the controller 114 is configured to send instructions to the unmanned vehicle 102 to cause the unmanned vehicle 102 to switch between the flight configuration in which the unmanned vehicle is propelled through air via the flight propulsion system 110 and the surface traverse configuration in which the unmanned vehicle 102 traverses a surface via the surface propulsion system 112. As shown in FIG. 1, the controller 114 includes at least one processor 191 coupled to at least one memory device 194. The controller 114 may also include at least one transceiver 195 for sending and receiving signals to and from the user interface 104 and/or other components of the system 100.

Figure 11:
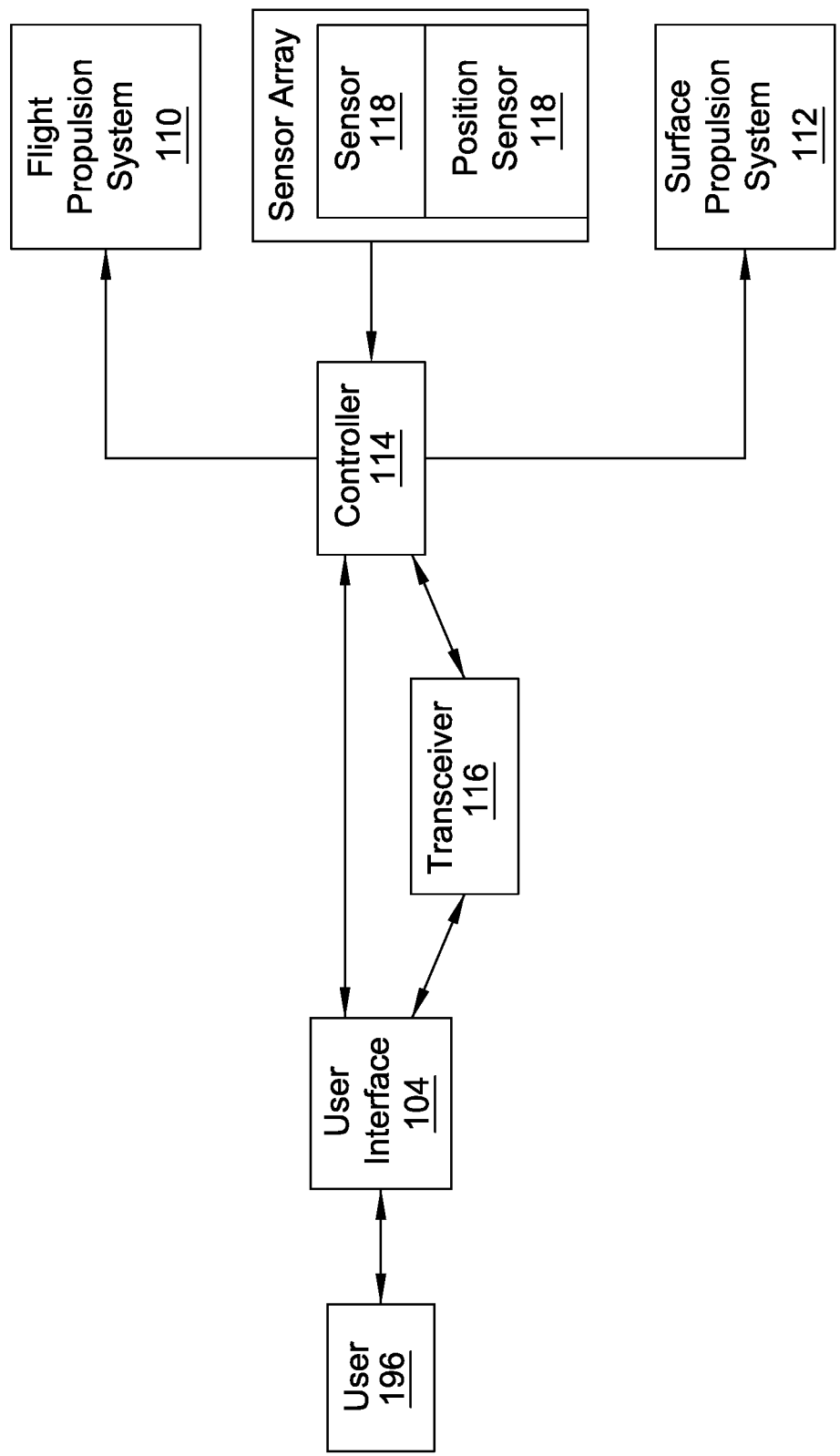
FIG. 11 is a block diagram showing operation of the system shown in FIG. 1.

With additional reference to FIG. 11, in the example, the controller 114 is coupled to the transceiver 116, the flight propulsion system 110, the surface propulsion system 112, and the sensor array (e.g., the at least one sensor 118). The controller 114 is configured to send and receive signals from the transceiver 116, to send and receive signals to the flight propulsion system 110 and the surface propulsion system 112, and to receive signals from the at least one sensor 118. In some embodiments, the controller 114 is also or alternatively configured to send and receive signals from the user interface 104.

The at least one sensor 118 is in communication with at least one processor (e.g., the processor 191 of the controller 114), and is configured to detect operational parameters of the unmanned vehicle 102, environmental characteristics, or any other information. For example, in some embodiments, the at least one sensor 118 is configured to detect a proximity and/or a characteristic of a surface. In some embodiments, the at least one sensor may include at least one of a camera, a range imaging camera system (e.g., a depth camera or a time-of-flight camera), a thermal sensor, a LiDAR sensor, a color sensor, an infrared sensor, a ground penetrating radar, an impact echo sensor, and an ultrasonic sensor. The at least one sensor 118 may also include a GPS sensor configured to determine a position of the unmanned vehicle 102.

In the example, the at least one sensor 118 is configured to measure a distance between the unmanned vehicle 102 and a surface, and to transmit the measured distance to the processor 191 of the controller 114. In other embodiments, the unmanned vehicle 102 may include any number of any suitable sensors 118 that enables the unmanned vehicle 102 to function as described herein.

In the example, the at least one sensor 118 is configured to detect properties of a surface or structure that the unmanned vehicle 102 traverses. For example, the at least one sensor 118 may detect characteristics that indicate cracks, corrosion, and/or other anomalies on the surface or within the structure that the unmanned vehicle 102 traverses. In some embodiments, the at least one sensor 118 enables remote visual inspection of a surface via the user interface 104.

In the example, the unmanned vehicle 102 may traverse the surface in the surface traverse configuration in a horizontal or at least partially vertical direction and at a constant speed when taking measurements with the at least one sensor 118 to provide enhanced stability for, for example, taking measurements and/or detecting aspects of the surface. For example, the controller 114 may operate the surface propulsion system 112 to propel the unmanned vehicle 102 at a constant speed. In other embodiments, the unmanned vehicle 102 may traverse the surface in the surface traverse configuration at any speed (including a variable speed) when taking measurements with the at least one sensor 118. In some embodiments, the controller 114 controls operation of the unmanned vehicle 102 based at least in part on information received from the at least one sensor 118. For example, the controller 114 may change the direction of movement of the unmanned vehicle 102, adjust the speed of the unmanned vehicle 102, and/or switch the unmanned vehicle 102 between the surface traverse configuration and the flight configuration when the information from the sensor 118 indicates an obstacle is in the path of the unmanned vehicle 102.

The system 100 also includes the user interface 104 that is configured to send signals to the controller 114 and that is configured to be operated by the user 196. In the example, and with reference to FIG. 1, the user interface 104 includes a processor 192 coupled to at least one memory device 200, a display screen 202, an input device 204, and a transceiver 206. In other embodiments, the user interface 104 may include any components that enable the system 100 to operate as described herein. In the example, the user interface 104 may enable autonomous or manual control of the unmanned vehicle 102. For example, the user interface 104 may enable manual control of the unmanned vehicle 102 via manual controls input to the input device 204 (e.g., a remote controller) of the user interface 104, or the user interface 104 may enable the user 196 to select that the unmanned vehicle 102 be controlled at least in part autonomously (e.g., via the controller 114). The user interface 104 may provide notifications to the user 196 when there are changes in the operating parameters of the unmanned vehicle 102. For example, the user interface 104 may indicate that the unmanned vehicle 102 has engaged a surface and can be switched from the flight configuration to the surface traverse configuration, and/or highlight an obstacle detected in the path of the unmanned vehicle 102.

To control the unmanned vehicle 102, the user 196 interacts with the user interface 104. When manually controlling the unmanned vehicle 102, the user 196 inputs manual controls into the input device 204 of the user interface 104. The transceiver 206 of the user interface 104 transmits the manual controls to the transceiver 116 on board the unmanned vehicle 102, and the transceiver 116 on board the unmanned vehicle 102 sends the received signals to the controller 114. Based on the signals received from the transceiver 116 on board the unmanned vehicle 102, the controller 114 manipulates (e.g., selectively powers various components of) the flight propulsion system 110 and the surface propulsion system 112 accordingly.

To enable autonomous control of the unmanned vehicle 102, the user 196 inputs instructions to the user interface 104 via the input device 204. The instructions may include a command to, for example, engage a specific surface, to fly to a specific location, and/or to traverse to a specific point on a surface. In the example, the user interface 104 transmits the instructions to the controller 114, and the controller 114 manipulates the flight propulsion system 110 and the surface propulsion system 112 accordingly such that the instructions are followed.

The controller 114 receives information from the at least one sensor 118, and the controller 114 is configured to send information to the user interface 104 (e.g., via the transceiver 195) and/or to determine, for example, operating parameters of the unmanned vehicle 102 or environmental characteristics based on the measured data. In the example, the controller 114 is configured to determine a distance between the unmanned vehicle 102 and a surface based on data or information received from the at least one sensor 118, and to determine when to switch the unmanned vehicle 102 between the flight configuration and the surface traverse configuration based on the determined distance. In some embodiments, the controller 114 may be configured to determine any suitable metrics based on any data measured by any suitable sensors 118 that enable the unmanned vehicle 102 to function as described herein.

In the example, in addition to the at least one sensor 118, the sensor array of the unmanned vehicle 102 further includes a position sensor 119. When operating the unmanned vehicle in specific environments (e.g., under a bridge), electronically determining the position of the unmanned vehicle 102 (e.g., via GPS) can be difficult. The position sensor 119 of the unmanned vehicle 102 is configured to provide position information or data of the unmanned vehicle 102 to the controller 114 (which may be relayed to the user interface 104) in a wide variety of environments. For example, the position sensor 119 may include an inertial measuring unit (IMU) or any other device configured to generate position information.

In another example, the position sensor 119 is in communication with one or more remote stations (e.g., a robotic total station) that have known positions. Further, the position of the position sensor 119 (and thus the position of the unmanned vehicle 102) with respect to the one or more stations can be determined by the controller 114 and/or provided by the remote stations. Based on the positions of the one or more stations and the position of the position sensor 119 relative to the one or more stations, the controller 114 can determine an absolute position (e.g., GPS coordinates) of the position sensor 119 and thus the unmanned vehicle 102. Therefore, the controller 114 can determine the position of the unmanned vehicle 102 based on information or data from the position sensor 119 even when a GPS position is unavailable or unreliable.

In some embodiments, the user interface 104 is configured to display data or measurements received from the controller 114 and/or the transceiver 116 on board the unmanned vehicle 102 via the display screen 202. In other embodiments, the user interface 104 is also or alternatively configured to display a graphical user interface (GUI) for controlling the unmanned vehicle 102 via the display screen 202. Through the GUI, the user 196 may send control commands to the unmanned vehicle 102 (e.g., via the transceiver 116 or the transceiver 195 of the unmanned vehicle 102) or view data or measurements received from the unmanned vehicle 102. The user may navigate the GUI, send control commands to the unmanned vehicle 102, or process data received from the unmanned vehicle 102 using the input device 204. The user interface 104 may include any suitable hardware components and/or applications that enable the user 196 to interact with and control the unmanned vehicle.

With reference again to FIGS. 5 and 6, in the example, the unmanned vehicle further includes a plurality of stoppers 201 mounted to the top surface 128 of the body 106 and configured to cushion the arms 148 in the event of failure of the bias members 182.

During operation, and with continued reference to FIGS. 5 and 6, the unmanned vehicle 102 starts on the ground in the flight configuration. The unmanned vehicle 102 (specifically, the flight propulsion system 110) is controlled either manually or autonomously to take off, and to fly to a surface. In manual control, the user controls the unmanned vehicle 102, in real time (e.g., via a remote control). For example, the user inputs controls into the user interface 104 that are sent to the unmanned vehicle 102, and that selectively control the flight propulsion assemblies 134 of the unmanned vehicle 102 to maneuver the unmanned vehicle 102. In partial autonomous control, the unmanned vehicle receives a command from the user interface 104, and the controller 114 of the unmanned vehicle controls the flight propulsion assemblies 134 of the unmanned vehicle based on the command. In either control mode, after the unmanned vehicle 102 takes off, the unmanned vehicle is flown to approach a surface (e.g., surface 208).

Prior to approaching the surface 208, each arm 148 of the surface propulsion system 112 is in the second, engaged position. As the unmanned vehicle 102 approaches the surface 208 (e.g., as shown in FIG. 5), the switching assemblies 152 are actuated (e.g., motors 178 are turned in the first direction), and each arm 148 is moved from the second, engaged position to the first, open position. With the arms 148 in the first, open positions, the unmanned vehicle 102 hovers near the surface 208 with the body 106 at a desired distance away from the surface 208 and the drive mechanisms 150 positioned to engage the surface 208 when each arm 148 is actuated to move from the first, open position to the second, engaged position. With the unmanned vehicle 102 in the desired position, each arm 148 is actuated to move to the second, engaged position (e.g., the motor 178 of each switching assembly 152 is turned in the second direction, and each bias member 182 biases the arms 148 toward the second, engaged position), and the drive mechanisms 150 engage the surface 208 (e.g., as shown in FIG. 6).

When the drive mechanisms 150 engage the surface 208, the unmanned vehicle 102 is switched between the flight configuration and the surface traverse configuration. For example, the flight propulsion system 110 is shut down (e.g., powered off by setting the speed of the motors 140 of the flight propulsion system 110 to zero, or by deactivating the motors 140 of the flight propulsion system 110 via an electronic method) and the surface propulsion system 112 is powered on.

In the example, the first battery 109 is configured to supply power to the flight propulsion system 110 when the unmanned vehicle 102 is in the flight configuration, and the second battery 111 is configured to supply power to the surface propulsion system 112 when the unmanned vehicle 102 is in the surface traverse configuration. Shutting down the flight propulsion system 110 enables the unmanned vehicle 102 to save energy, as operating the flight propulsion system 110 uses more energy than operating the surface propulsion system 112. The flight propulsion system 110 may be powered on at any time during operation of the unmanned vehicle 102 (e.g., when the unmanned vehicle is in the surface traverse configuration). For example, the flight propulsion system 110 may be powered on if the unmanned vehicle 102 unexpectedly disengages from the surface 208.

When the unmanned vehicle 102 engages the surface 208, the unmanned vehicle 102 is held in the traversing position (shown in FIG. 6) relative to the surface 208. Specifically, in the traversing position, the body 106 is suspended a distance (e.g., a predetermined distance) from the surface 208 that prevents components (e.g., the controller 114 and/or the at least one sensor 118) and body 106 from contacting surface 208 and that allows clearance for inspection of the surface and/or the corresponding structure. In the example, the unmanned vehicle 102 is configured to engage horizontal surfaces (i.e., surfaces with little or no incline as shown in FIG. 6), slanted surfaces (i.e., inclined surfaces), or a combination of both (e.g., a beam having both horizontal and slanted surfaces). The unmanned vehicle 102 is configured to be held in the traversing configuration below slanted surfaces using the same process as described herein with respect to the horizontal surface 208. When the unmanned vehicle 102 is held in the traversing position below a slanted surface, part of the slanted surface may be vertically below the unmanned vehicle, such that the unmanned vehicle is not below the entire surface. In such instances, the unmanned vehicle 102 may only be below a portion of the slanted surface when in the traversing position.

In the example, the drive mechanisms 150 are configured to be positioned on opposite sides of the structure or surface 208 (e.g., sides of a beam or girder) and clamp the surface 208 therebetween. Accordingly, the surface 208 may act as a track for the unmanned vehicle 102 to travel along when the drive mechanisms 150 are engaged with the surface. In other embodiments, the drive mechanisms 150 may engage the surface 208 in any suitable manner. For example, in some embodiments, the drive mechanisms 150 include magnets, adherent materials, friction-inducing materials, or any other engagement features.

Once the unmanned vehicle is in the traversing position, the unmanned vehicle 102 can traverse the surface 208 via the surface propulsion system 112. Specifically, the surface propulsion system 112 powers the drive mechanisms 150 to propel the unmanned vehicle 102 along the surface 208. As the unmanned vehicle traverses the surface 208, the unmanned vehicle 102 can perform an inspection operation of the surface 208 and/or the corresponding structure via the at least one sensor 118. For example, the at least one sensor 118 may detect characteristics that indicate cracks, corrosion, or other anomalies on the surface 208 or within the structure that the unmanned vehicle 102 traverses. In some embodiments, the at least one sensor 118 enables remote visual inspection of the surface 208 via the user interface 104. In the example, information from the at least one sensor 118 is transmitted to the controller 114 and is stored in the at least one memory 194 of the controller 114. Additionally or alternatively, the information from the at least one sensor 118 may be transmitted to the user interface 104 via the controller 114.

The unmanned vehicle 102 can switch from the surface traverse configuration to the flight configuration to fly through the air. For example, starting with the unmanned vehicle 102 in the surface traverse configuration (e.g., as shown in FIG. 6), and with the plurality of drive mechanisms 150 engaged with the surface 208, the unmanned vehicle 102 powers on the flight propulsion system 110. The switching assemblies 152 of the unmanned vehicle 102 are then actuated to move the arms 148 to the retracted, first position, thus disengaging the plurality of drive mechanisms 150 from the surface 208. The flight propulsion system 110 then propels the unmanned vehicle 102 through the air. The surface propulsion system 112 may be powered off before or after the drive mechanisms disengage from the surface 208. Similar to the flight propulsion system 110, the surface propulsion system 112 may be powered on at any time during operation of the unmanned vehicle (e.g., when the unmanned vehicle is in the flight configuration). For example, the surface propulsion system 112 may be powered on to assist with engagement and disengagement of the unmanned vehicle 102 from the surface 208.

In the example, the unmanned vehicle 102 is also configured to detect and avoid obstacles that the unmanned vehicle 102 encounters while the unmanned vehicle 102 traverses a surface (e.g., surface 208) in the surface traverse configuration. Specifically, the at least one sensor 118 (e.g., an ultrasonic sensor or a camera) of the unmanned vehicle 102 is configured to detect an obstacle that the unmanned vehicle 102 encounters while the unmanned vehicle 102 traverses a surface in the surface traverse configuration.

After detecting the obstacle, the unmanned vehicle 102 disengages from the surface, flies to a new surface (or to a different location on the same surface) and engages the new surface (or the same surface at the different location) using the surface propulsion system 112 as described above. The unmanned vehicle 102 may autonomously or manually (or some combination of both) be controlled when detecting and avoiding obstacles. For example, in some embodiments, the controller 114 is configured to control the flight propulsion system 110 and the surface propulsion system 112 (e.g., via instructions sent from the processor 191 of the controller 114 to the flight propulsion system 110 and/or the surface propulsion system 112) to avoid an obstacle.

In some embodiments, the controller 114 of the unmanned vehicle 102 determines a distance between the unmanned vehicle 102 and a surface (e.g., surface 208) via data measured by the at least one sensor 118 and/or the position sensor 119. The determined distance between the unmanned vehicle 102 and the surface may then be transmitted to and/or displayed on the user interface 104 and referenced by the user 196 when controlling the unmanned vehicle 102 (e.g., when controlling the unmanned vehicle 102 to engage a surface or to avoid an obstacle). In other embodiments, the determined distance between the unmanned vehicle 102 and the surface may be used by the controller 114 to determine when to actuate the switching assemblies 152 such that the unmanned vehicle 102 can effectively engage the surface during autonomous control of the unmanned vehicle 102 via the controller 114.

In some embodiments, the unmanned vehicle 102 may be configured to perform one or more maintenance and/or inspection operations for the surface or structure that the unmanned vehicle 102 traverses. For example, the at least one sensor 118 may collect information as the unmanned vehicle 102 travels along the surface or structure. In addition, in some embodiments, the unmanned vehicle 102 may include a tool that is configured to perform a maintenance or repair operation on the surface (e.g., epoxy or concrete filling).

Figure 12:
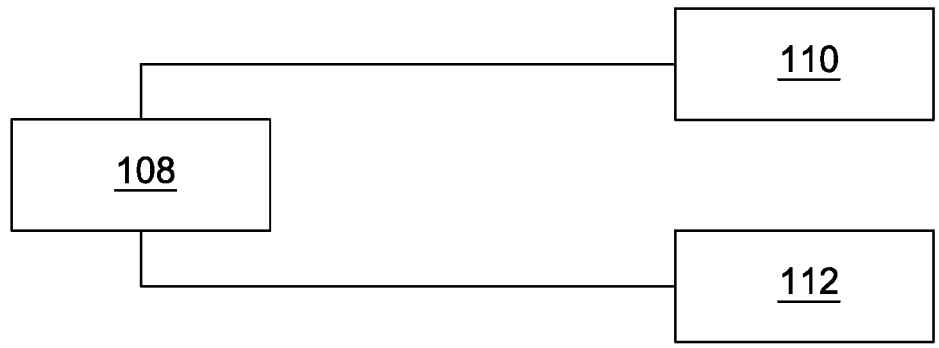
FIG. 12 is a block diagram showing an example power distribution layout for transferring power from at least one power source to the flight propulsion system and the surface propulsion system of the unmanned vehicle shown in FIG. 2.

FIG. 12 illustrates an example setup for distributing power from the at least one power source 108 to the flight propulsion system 110 and to the surface propulsion system 112. In the example illustrated in FIG. 12, the at least one power source 108 includes a battery. As shown in FIG. 12, in the example, the at least one power source is coupled to both the flight propulsion system 110 and the surface propulsion system 112 such that the same battery powers both the flight propulsion system 110 and the surface propulsion system 112. In the example, power from the at least one power source 108 is provided to the flight propulsion system 110 and the surface propulsion system 112 via separate circuits, and a switch may selectively connect the at least one power supply to the flight propulsion system 110 and/or the surface propulsion system 112. Further, the at least one power source 108 may provide power to both the flight propulsion system 110 and the surface propulsion system 112 simultaneously, or may selectively provide power to only one of the flight propulsion system 110 and the surface propulsion system 112 at a time. When powering both the flight propulsion system 110 and the surface propulsion system 112 via the same at least one power source 108, a voltage converter may be coupled between the at least one power source 108 and the flight propulsion system 110 and/or between the at least one power source 108 and the surface propulsion system 112. In some embodiments, the flight propulsion system 110 and the surface propulsion system 112 may be powered by separate power sources (e.g., different batteries—similar to the unmanned vehicle 102) or both may be powered by multiple power sources (e.g., multiple batteries).

Figure 13:
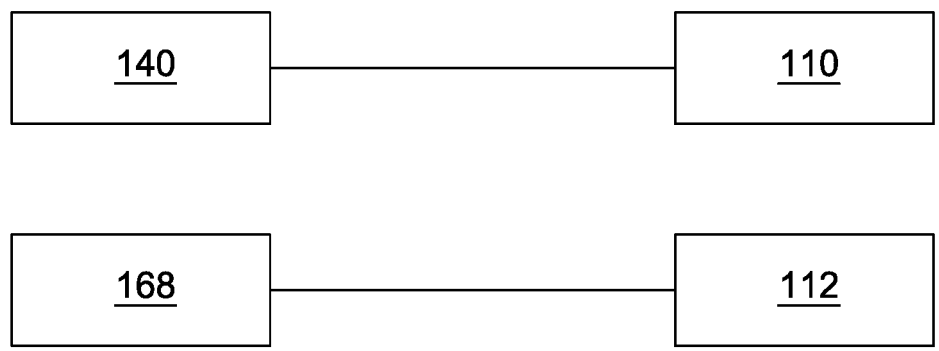
FIG. 13 is a block diagram showing an example drive system including a separate motor coupled to each of the flight propulsion system and the surface propulsion system of the unmanned vehicle shown in FIG. 2.
Figure 14:
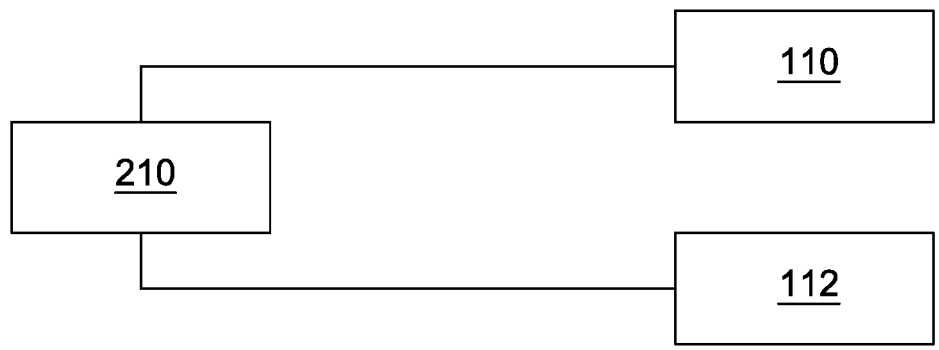
FIG. 14 is a block diagram showing an example drive system including one motor connected to both the flight propulsion system and the surface propulsion system of the unmanned vehicle shown in FIG. 2.

FIGS. 13 and 14 illustrate example setups for distributing mechanical power to the flight propulsion system 110 and to the surface propulsion system 112 via a motor. As shown in FIG. 12, in the example, separate motors 140, 168 are used to power the flight propulsion system 110 and the surface propulsion system 112. The motor 140 is drivingly connected to the flight propulsion system 110. When the motor 140 receives power from the power source 108 (e.g., as shown in FIG. 12), the motor 140 causes the flight propulsion system 110 to propel the unmanned vehicle 102 through the air. The motor 168 is drivingly connected to the surface propulsion system 112. When the motor 168 receives power from the power source 108 (e.g., as shown in FIG. 12), the motor 168 causes the surface propulsion system 112 to propel the unmanned vehicle 102 along a surface.

FIG. 14 illustrates an example of a drive system for the unmanned vehicle 102 shown in FIG. 1. The drive system includes a motor 210 (e.g., motor 140 of the flight propulsion system 110 or motor 168 of the surface propulsion system 112) that is drivingly connected to both the flight propulsion system 110 and the surface propulsion system 112. In the example shown in FIG. 14, clutch assemblies 145, 176 may be connected between the motor 210 and the propulsion systems 110, 112, respectively, to selectively provide or prevent power from being transferred from the motor 210 to the surface propulsion system 112 and/or the flight propulsion system 110. The clutch assemblies 145, 176 enable better control of the unmanned vehicle 102 and a lower energy consumption of the unmanned vehicle by allowing selective control of the flight propulsion system 110 and the surface propulsion system 112. In some embodiments, clutch assemblies 145, 176 may not be used, and the motor 210 may power both the flight propulsion system 110 and the surface propulsion system 112 whenever the motor 210 is powered.

In some embodiments, multiple motors 140, 168, 210 may be used to power the flight propulsion system 110 and/or the surface propulsion system 112. The unmanned vehicle may include any suitable number of motors 140, 168, 210 arranged in any suitable configuration that enables the unmanned vehicle 102 to function as described herein.

Figure 15:
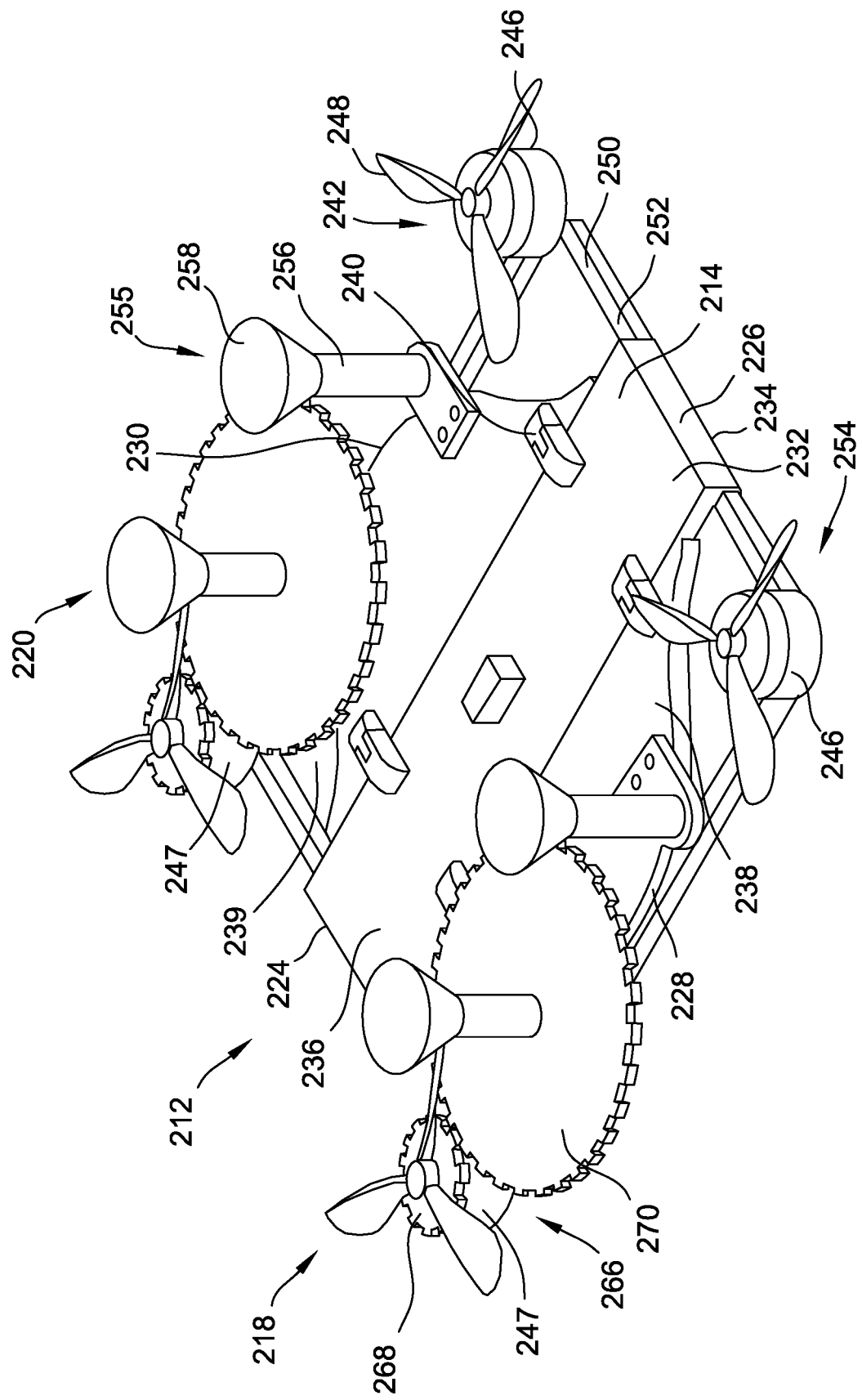
FIG. 15 is an isometric view of another example unmanned vehicle for use with the system shown in FIG. 1.
Figure 16:
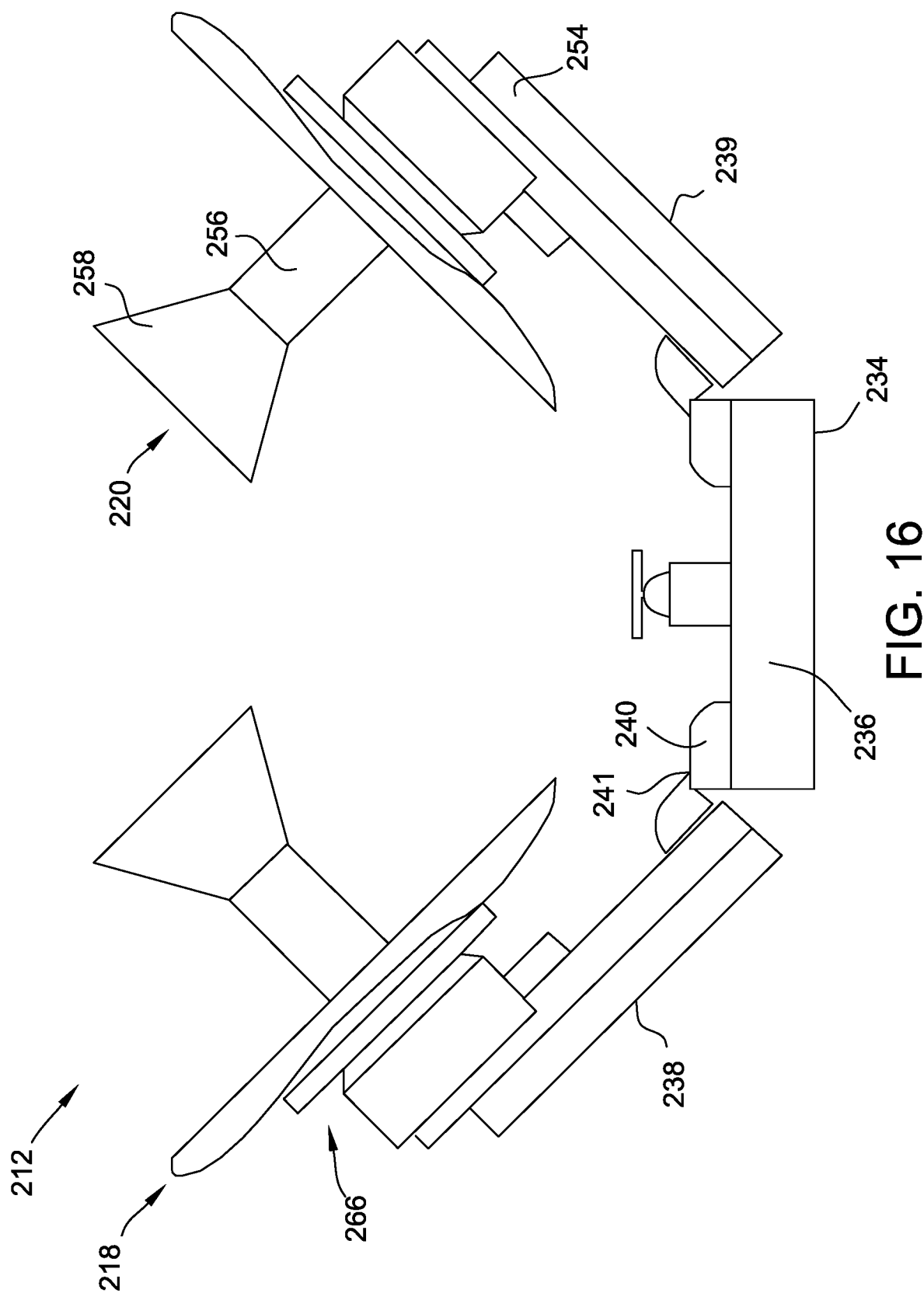
FIG. 16 is a side view of the unmanned vehicle shown in FIG. 15.

FIGS. 15 and 16 illustrate another example of the unmanned vehicle 102. As shown in FIG. 15, the unmanned vehicle 212 is similar to the unmanned vehicle 102, except as described herein.

The unmanned vehicle 212 includes a body 214 and at least one power source (not shown) coupled to the body 214, a flight propulsion system 218 configured to propel the unmanned vehicle 212 through air, a surface propulsion system 220 configured to propel the unmanned vehicle 212 along a surface, and a controller (not shown). Similar to the unmanned vehicle 102, the unmanned vehicle 212 also includes at least one sensor (not shown) and at least one transceiver (not shown). The unmanned vehicle 212 is configured to switch between a flight configuration (e.g., shown in FIG. 15) in which the unmanned vehicle 212 is propelled through air via the flight propulsion system 218, and a surface traverse configuration (e.g., shown in FIG. 16) in which the unmanned vehicle 212 is propelled along a surface via the surface propulsion system 220. The controller is configured to control the unmanned vehicle 212 to cause the unmanned vehicle 212 to switch between the flight configuration and the surface traverse configuration (e.g., as a result of manual control, autonomous control, or a combination thereof).

As shown in FIG. 15, the body 214 includes a first side 224, a second side 226, a first end 228, a second end 230, a top surface 232, and a bottom surface 234. The body 214 further includes a plurality of portions 236, 238, 239. In the example, the body 214 includes a first portion 236, a second portion 238, and a third portion 239. The first portion 236 is positioned between and movably attached to the second portion 238 and the third portion 239. In other embodiments, the body 214 may include any suitable number of second and third portions 238, 239 having any suitable configuration that enables the unmanned vehicle 212 to function as described herein.

The body 214 also includes a frame 250 that is coupled to the bottom surface 234 of the body 214. In the example, the frame 250 includes supports 252 that are each coupled together to form a rectangular shape having four corners 254. In some embodiments, the frame 250 may have any suitable configuration and any suitable number of supports 252 that enables the unmanned vehicle 212 to function as described herein.

Similar to the body 106 of the unmanned vehicle 102, the body 214 further includes at least one power source (not shown). The at least one power source may include, for example, a battery or any other suitable power source that enables the unmanned vehicle 212 to function as described herein. The flight propulsion system 218 and the surface propulsion system 220 are coupled to the body 214. In the example, the flight propulsion system 218 and the surface propulsion system 220 are coupled to the two portions 238, 239 of the body 214. In other embodiments, the flight propulsion system 218 and the surface propulsion system 220 may be coupled to the body 214 in any suitable location that enables the unmanned vehicle 212 to function as described herein.

The body 214 also includes at least one switching assembly 240 (FIG. 16) pivotably coupling the first portion 236 to the second portion 238 and to the third portion 239. Each switching assembly 240 assembly includes a hinge 241 and a corresponding hinge actuator (not shown) that are configured to pivot the second portion 238 and the third portion 239 of the body 214 relative to the first portion 236 of the body 214. The hinge actuator may include, for example, a motor that is integrally formed with or otherwise coupled to the hinge 241 and configured to selectively cause movement of the hinge 241 based on instructions from the controller (e.g., controller 114). In other embodiments, each switching assembly 240 may share a common hinge actuator that may include, for example, one or more motors configured to pivot the second portion 238 and the third portion 239 of the body 214 relative to the first portion 236 of the body 214. In the example, the body 214 includes four switching assemblies 240, each including a separate electric motor integrally formed with each switching assembly 240 as the hinge actuator, with two switching assemblies 240 pivotably coupling each of the second portion 238 and the third portion 239 to the first portion 236. The at least one switching assembly 240 is configured to rotate the second portion 238 and the third portion 239 relative to the first portion 236 when the unmanned vehicle 212 is switched between the flight configuration and the surface traverse configuration.

As shown in FIG. 15, each flight propulsion assembly 242 includes a motor 246, 247 and a flight propulsion device 248. The motor 246, 247 is coupled to the frame 250 of the body 214 near a corner 254 of the frame 250. The flight propulsion device 248 is operably coupled to the motor 246, 247 such that each motor 246, 247 powers the corresponding flight propulsion device 248. In the example, the unmanned vehicle 212 includes four flight propulsion assemblies 242, each including one motor 246, 247. In other embodiments, the flight propulsion assemblies 242 may include a shared motor (e.g., motor 247) that powers two or more of the flight propulsion assemblies 242. In any embodiment, the unmanned vehicle 212 may include any suitable number of flight propulsion assemblies 242 including any suitable number of motors 246, 247 that enable the unmanned vehicle 212 to function as described herein.

The flight propulsion system 218 is operable to propel the unmanned vehicle 212 through the air. For example, when power is provided to the motor 246, 247 of each flight propulsion assembly 242, each motor 246 causes the corresponding flight propulsion device 248 of each flight propulsion assembly 242 to produce a thrust force, and the flight propulsion device 248 of each flight propulsion assembly 242 propels the unmanned vehicle 212 through air.

In the illustrated embodiment, the flight propulsion system 218 includes four flight propulsion assemblies 242. In any embodiment, the flight propulsion system 218 may include any suitable number of flight propulsion assemblies 242 having any suitable configuration, including any suitable flight propulsion device 248, that enables the unmanned vehicle 212 to function as described herein.

In the example, the flight propulsion device 248 of each flight propulsion assembly 242 is a propeller. In other embodiments, the flight propulsion system 218 may include any suitable flight propulsion device 242.

The surface propulsion system 220 is coupled to the at least one power source, and includes a plurality of drive assemblies 255 each including a plurality of drive mechanisms 258. When the unmanned vehicle 212 is in the surface traverse configuration, the surface propulsion system 220 is configured to engage a surface and to maintain the body 214 in a traversing position below the surface (similar to the traversing position of the unmanned vehicle 102) as the surface propulsion system 220 propels the unmanned vehicle 212 along the surface.

As shown in FIGS. 15 and 16, each drive mechanism 258 includes an arm portion 256, and each arm portion 256 is coupled to the body 214 near a first end and extends to a second end.

As described further herein, each arm portion 256 is moveable between a first, open position and a second, engaged position, or vice-versa, via the hinge actuator within the switching assemblies 240. The plurality of arm portions 256 selectively position the plurality of drive mechanisms 258 to engage a surface and to maintain the body 214 in the traversing position below the surface when each arm portion 256 is moved to its second, engaged position.

As shown in FIGS. 15 and 16, each drive assembly 255 is powered by one of the motors 247 of the flight propulsion system 218. The drive assemblies 255 are coupled to the second portion 238 and the third portion 239 of the body 214 and receive power from the motors 247 of the flight propulsion assembly 242 via a transmission assembly 266 positioned on the respective portion 238, 239. In the example, each transmission assembly 266 includes a first gear 268 operably coupled to a second gear 270. The first gear 268 is powered via the motor 247 to rotate. As the first gear 268 rotates, teeth of the first gear 268 engage teeth of the second gear 270, thereby causing the second gear 270 to rotate. The drive mechanisms 258 are operably coupled to the second gear 270 (e.g., via the arm portions 256 and/or via a transmission assembly similar to the transmission assembly 170 described relative to the unmanned vehicle 102), and rotate with rotation of the second gear 270. Alternatively, first gear 268 and second gear 270 may be operably coupled together via a transfer component (i.e., a belt or cable that is passed over and mechanically couples the first and second gears 268, 270) such that rotation of the first gear 268 causes the transfer component to move, which thereby causes the second gear 270 to rotate.

In the example, two drive mechanisms 258 are each coupled to separate transmission assemblies 266 and are each driven via the corresponding motors 247. The remaining two drive mechanisms 258 are not driven. In some embodiments, all drive mechanisms 258 may be driven via the two transmissions assemblies 266 (e.g., with two drive mechanisms 258 coupled to each transmission assembly 266), or the unmanned vehicle 212 may include additional transmission assemblies 266 such that each drive mechanism 258 is driven via a separate transmission assembly 266. In some embodiments, all drive mechanisms 258 may be driven via the same transmission assembly 266. In some embodiments, the drive mechanisms 258 may be powered by one or more motors that do not provide power to the flight propulsion system 218.

In the example, the motors 247 of the flight propulsion assemblies 242 provide power to components of both the flight propulsion system 218 and the surface propulsion system 220. By powering multiple systems with the same motor(s), the total number of motors on board the unmanned vehicle 212 can be decreased, thereby reducing the overall weight of the unmanned vehicle 212 and reducing the energy needed to propel the unmanned vehicle 212. The configuration of the flight propulsion assemblies 242 leads to a more efficient use of the energy (e.g., stored electrical energy) on board the unmanned vehicle 212 and a longer possible operation time for the unmanned vehicle 212 before the at least one power source must be replaced and/or recharged.

In some embodiments, each drive assembly 255 may further include at least one clutch assembly configured to selectively provide power to the plurality of drive mechanisms 258 when the unmanned vehicle 212 is in the surface traverse configuration and to selectively prevent transmission of power to the plurality of drive mechanisms 258 when the unmanned vehicle 212 is in the flight configuration or when the unmanned vehicle 212 is switching between the flight configuration and the surface traverse configuration. The at least one clutch assembly of the drive assemblies 255 may be similar in configuration and in location to the clutch assembly 176 described above for the unmanned vehicle 102.

In operation, the unmanned vehicle 212 is operated to engage a surface using to a similar process to that described above for the unmanned vehicle 102. For example, the switching assemblies 240 are operable to switch the unmanned vehicle 212 between an open position and an engaged position. In particular, in the example shown in FIGS. 15 and 16, the hinge actuators within the switching assemblies 240 are actuated to move the portions 238, 239 and the corresponding drive mechanisms 258 from a first, open position (e.g., shown in FIG. 15), to a second, engaged position (e.g., shown in FIG. 16) to engage the surface. In addition, when shutting down the flight propulsion system 218, the clutch assemblies (e.g., clutch assemblies 145) of the flight propulsion system 218 disengage each motor 247 from the corresponding flight propulsion device 248 such that power from each motor 246 is prevented from being transferred to the corresponding flight propulsion device 248. In some embodiments, motors 246 of the flight propulsion assembly may also have corresponding clutch assemblies (e.g., clutch assemblies 145) that disengage the motors 246 from the corresponding flight propulsion device 248. Further, when the surface propulsion system 220 is powered on, the clutch assemblies of the surface propulsion system 220 engage at least one motor 247 of the flight propulsion system, 220, thereby enabling power to be transferred from the at least one motor 247 to the drive mechanisms 258.

The unmanned vehicle 212 is also operated to disengage a surface using to a similar process to that described above for the unmanned vehicle 212. For example, with the drive mechanisms 258 engaging the surface, the flight propulsion system 218 is powered on, and the hinge actuators of the switching assemblies 240 are actuated to move the portions 238, 239 and the drive mechanisms 258 from the second, engaged position (e.g., shown in FIG. 16), to the first, open position (e.g., shown in FIG. 15) to disengage the surface. When powering on the flight propulsion system 218, the clutch assemblies of the flight propulsion system 218 engage the corresponding motor 246, 247 such that power from the motors 246, 247 is transferred to the corresponding flight propulsion devices 248. Further, when the surface propulsion system 220 is powered off, the clutch assemblies of the surface propulsion system 220 disengage the corresponding motor 247, such that power from the motors 247 is prevented from being transferred to the corresponding drive mechanisms 258.

Figure 17:
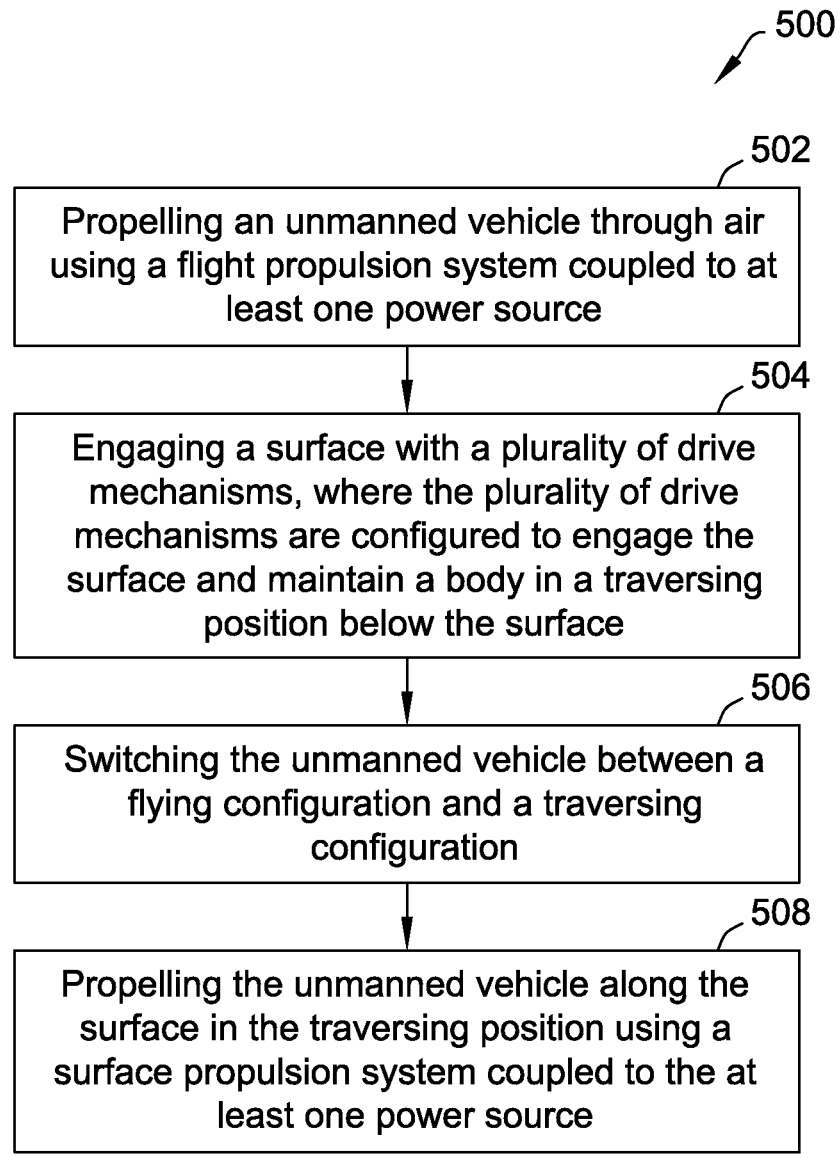
FIG. 17 is a flow chart illustrating an example method for operating an unmanned vehicle.

FIG. 17 is a flow chart illustrating an example method 500 for operating an unmanned vehicle such as the unmanned vehicle 102 or the unmanned vehicle 212. Referring to FIGS. 1, 2, and 15-17, the method 500 includes propelling 502 the unmanned vehicle (e.g., unmanned vehicle 102 or 212) through air using the flight propulsion system (e.g., flight propulsion system 110, 218) coupled to the at least one power source (e.g., power source 108). The method also includes engaging 504 the surface with the plurality of drive mechanisms (e.g., drive mechanisms 150, 258). The plurality of drive mechanisms are configured to engage the surface and maintain the body (e.g., body 106, 214) in a traversing position below the surface. When in the traversing position, the body of the unmanned vehicle is suspended a distance from the surface that prevents components (e.g., the controller 114, the at least one sensor 118, and/or the switching assemblies 240) and the body from contacting the surface and that allows clearance for inspection of the surface and/or the corresponding structure.

The method 500 also includes switching 506 the unmanned vehicle between a flight configuration and a surface traverse configuration. For example, the flight propulsion system may be powered off, and the surface propulsion system may be powered on, thereby enabling the drive mechanisms to propel the unmanned vehicle along the surface, and thereby preventing power from being delivered to the flight propulsion system.

The method 500 further includes propelling 508 the unmanned vehicle along the surface in the traversing position using the surface propulsion system coupled to the at least one power source. For example, the drive mechanisms of the unmanned vehicle receive power from the surface propulsion system and are rotated. As the drive mechanisms rotate, friction between the drive mechanisms and the surface causes the unmanned vehicle to be propelled along the surface. The unmanned vehicle follows along the surface like a track. The unmanned vehicle may traverse along flat (horizontal surfaces) or slanted surfaces (i.e., surfaces having an incline).

The unmanned vehicle may perform one or more maintenance and/or inspection operations for the surface or structure. For example, the sensor (e.g., sensor 118) may collect information as the unmanned vehicle travels along the surface or structure. In addition, in some embodiments, the unmanned vehicle includes a tool that is configured to perform a maintenance or repair operation on the surface or structure.

After the unmanned vehicle has traversed at least a portion of the surface, the unmanned vehicle may switch to the flight configuration and leave the surface. For example, the flight propulsion system may be powered on, and the switching assembly may be operated to disengage the drive mechanisms from the surface. The surface propulsion system may be powered off before or after the drive mechanisms are disengaged. Then, the flight propulsion system propels the unmanned vehicle through the air to a location. For example, the unmanned vehicle may fly to another location on the structure and/or return to a base station.

Figure 18:
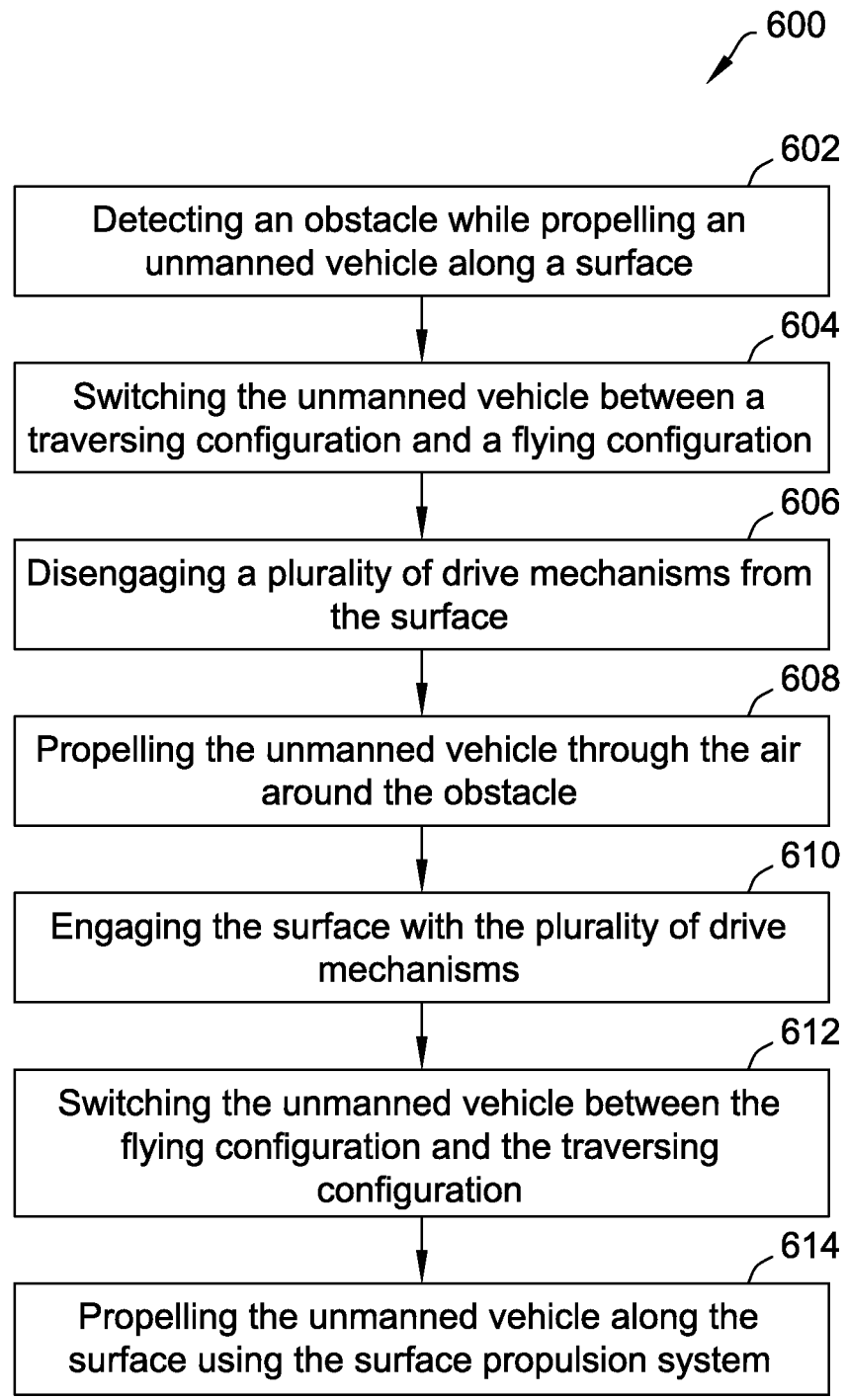
FIG. 18 is a flow chart illustrating an example method for operating an unmanned vehicle to avoid an obstacle.

FIG. 18 is a flow chart illustrating an example method 600 for operating an unmanned vehicle to detect and traverse an obstacle. The method 600 includes detecting 602 an obstacle while propelling the unmanned vehicle (e.g., unmanned vehicle 102, 212) along the surface. The method 600 also includes switching 604 the unmanned vehicle between the surface traverse configuration and the flight configuration, disengaging 606 a plurality of drive mechanisms (e.g., drive mechanisms 150, 258) from the surface, and propelling 608 the unmanned vehicle through the air around the obstacle. The method 600 further includes engaging 610 the surface with the plurality of drive mechanisms, switching 612 the unmanned vehicle between the flight configuration and the surface traverse configuration, and propelling 614 the unmanned vehicle along the surface using a surface propulsion system (e.g., surface propulsion system 112, 220).

The embodiments of the unmanned vehicle described herein enable at least the following technical benefits and advantages: (i) providing an unmanned vehicle that is capable of shutting down its flight propulsion system when traversing a surface or structure to save energy and thus requiring fewer power sources (and less weight) on board, (ii) reduced risk of unexpected disengagement of the unmanned vehicle from a surface or structure, (iii) enhanced safety of traversing surfaces or structures to detect and measure aspects of the surface or structure, (iv) enhanced obstacle avoidance when traversing a surface or structure, (v) enhanced position detection when traversing a surface or structure, (vi) enhanced capabilities of engaging with a surface or structure (e.g., determining when to engage with a surface or structure), and (vii) ability to engage with surfaces or structures of many configurations.

When introducing elements of the present disclosure or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense.

What is claimed is:

1. An unmanned vehicle comprising:
   a body;
   at least one power source coupled to the body;
   a flight propulsion system coupled to the at least one power source and configured to propel the unmanned vehicle through air; and
   a surface propulsion system coupled to the at least one power source and configured to propel the unmanned vehicle along a surface, wherein the surface propulsion system comprises:
   a plurality of arms;
   a plurality of drive mechanisms operably coupled to the plurality of arms; and
   at least one spring operably coupled to the plurality of arms,
   wherein each arm of the plurality of arms is moveable between a first, open position and a second, engaged position,
   wherein the plurality of arms selectively position the plurality of drive mechanisms to engage the surface and to maintain the body in the traversing position below the surface when each arm of the plurality of arms is moved to the second, engaged position, and
   wherein the at least one spring is configured to bias each arm of the plurality of arms toward the second, engaged position;
   wherein the unmanned vehicle is configured to switch between a flight configuration in which the unmanned vehicle is propelled through air via the flight propulsion system, and a surface traverse configuration in which the unmanned vehicle is propelled along the surface via the surface propulsion system, and
   wherein, in the surface traverse configuration, the surface propulsion system is configured to engage the surface and to maintain the body in a traversing position below the surface as the surface propulsion system propels the unmanned vehicle along the surface.

2. The unmanned vehicle according to claim 1, wherein the at least one power source comprises a battery, wherein the flight propulsion system and the surface propulsion system are coupled to the battery, and wherein the battery is configured to supply power to the flight propulsion system when the unmanned vehicle is in the flight configuration, and to supply power to the surface propulsion system when the unmanned vehicle is in the surface traverse configuration.

3. The unmanned vehicle according to claim 1, wherein switching between the flight configuration and the surface traverse configuration comprises controlling the flight propulsion system to position the body at a predetermined distance vertically below the surface, actuating each arm of the plurality of arms to move to their respective second, engaged positions thereby enabling the plurality of drive mechanisms to engage the surface, shutting down the flight propulsion system, and enabling control of the surface propulsion system, wherein the flight propulsion system and the surface propulsion system are controllable via manual control by a user or via autonomous control.

4. The unmanned vehicle according to claim 1, wherein each drive mechanism of the plurality of drive mechanisms is shaped like a portion of a cone.

5. The unmanned vehicle according to claim 1, wherein each drive mechanism of the plurality of drive mechanisms comprises a polyurethane material.

6. The unmanned vehicle according to claim 1 further comprising at least one motor, wherein the surface propulsion system further comprises:

at least one transmission configured to transfer power from the at least one motor, along the plurality of arms, and to the plurality of drive mechanisms when the unmanned vehicle is in the surface traverse configuration; and at least one clutch assembly configured to selectively provide power to the plurality of drive mechanisms when the unmanned vehicle is in the surface traverse configuration and to selectively prevent transmission of power to the plurality of drive mechanisms when the unmanned vehicle is in the flight configuration or when the unmanned vehicle is switching between the flight configuration and the surface traverse configuration.

7. The unmanned vehicle according to claim 6, wherein the flight propulsion system and the surface propulsion system are both powered by the at least one motor.

8. The unmanned vehicle according to claim 1, wherein the flight propulsion system comprises at least one propeller.

9. The unmanned vehicle according to claim 1 further comprising:
at least one sensor in communication with at least one processor,
wherein the at least one sensor is configured to measure a distance between the unmanned vehicle and the surface, and
wherein the at least one processor receives the measured distance between the unmanned vehicle and the surface and determines when to switch between the flight configuration and the surface traverse configuration based on the measured distance between the unmanned vehicle and the surface.

10. The unmanned vehicle according to claim 1, wherein the body further comprises:
a first portion;
a second portion; and
at least one switching assembly coupling the first portion to the second portion,
wherein the at least one switching assembly is configured to rotate the second portion relative to the first portion when the unmanned vehicle is switched between the flight configuration and the surface traverse configuration.

11. A system comprising:
an unmanned vehicle comprising:
a body;
at least one power source coupled to the body;
a flight propulsion system coupled to the at least one power source and configured to propel the unmanned vehicle through air; and
a surface propulsion system coupled to the at least one power source and configured to propel the unmanned vehicle along a surface, wherein the surface propulsion system comprises:
a plurality of arms;
a plurality of drive mechanisms operably coupled to the plurality of arms; and
at least one spring operably coupled to the plurality of arms,
wherein each arm is moveable between a first, open position and a second, engaged position,
wherein the plurality of arms selectively position the plurality of drive mechanisms to engage the surface and to maintain the body in the traversing position below the surface when each arm of the plurality of arms is moved to the second, engaged position, and wherein the at least one spring is configured to bias each arm of the plurality of arms toward the second, engaged position; and a controller configured to send instructions to the unmanned vehicle to cause the unmanned vehicle to switch between a flight configuration in which the unmanned vehicle is propelled through air via the flight propulsion system and a surface traverse configuration in which the unmanned vehicle traverses the surface via the surface propulsion system,
wherein, in the surface traverse configuration, the surface propulsion system is configured to engage the surface and maintain the body in a traversing position below the surface as the surface propulsion system propels the unmanned vehicle along the surface.

12. The system according to claim 11, wherein the at least one power source comprises a battery, wherein the flight propulsion system and the surface propulsion system are coupled to the battery, and wherein the battery is configured to supply power to the flight propulsion system when the unmanned vehicle is in the flight configuration, and to supply power to the surface propulsion system when the unmanned vehicle is in the surface traverse configuration.

13. The system according to claim 10, wherein the unmanned vehicle further comprises at least one sensor in communication with the controller, wherein the at least one sensor is configured detect a surface, wherein the controller determines a distance between the vehicle and the surface based on data from the sensor, and wherein the controller determines when to switch between the flight configuration and the surface traverse configuration based on the determined distance between the unmanned vehicle and the surface.

14. The system according to claim 10, wherein the controller sends instructions to the flight propulsion system and to the surface propulsion system to switch the unmanned vehicle between the flight configuration and the surface traverse configuration.

15. A method of operating an unmanned vehicle, the unmanned vehicle comprising a body and at least one power source coupled to the body, the method comprising:
propelling the unmanned vehicle through air using a flight propulsion system coupled to the at least one power source;
engaging a surface with a plurality of drive mechanisms, wherein the plurality of drive mechanisms are configured to engage the surface and maintain the body in a traversing position below the surface;
switching the unmanned vehicle between a flight configuration and a surface traverse configuration; and
propelling the unmanned vehicle along the surface in the traversing position using a surface propulsion system coupled to the at least one power source, wherein the surface propulsion system comprises:
a plurality of arms, wherein each arm is moveable between a first, open position and a second, engaged position,
a plurality of drive mechanisms operably coupled to the plurality of arms, and
at least one spring operably coupled to the plurality of arms, wherein the spring is configured to bias each arm of the plurality of arms toward the second, engaged position; and
positioning, the plurality of drive mechanisms to engage the surface and to maintain the body in the traversing position below the surface when each arm of the plurality of arms is moved to the second, engaged position.

16. The method according to claim 15, wherein switching the unmanned vehicle between the flight configuration and the surface traverse configuration comprises:
shutting down the flight propulsion system; and
enabling control of the surface propulsion system.

17. The method according to claim 15 further comprising:
detecting an obstacle while propelling the unmanned vehicle along the surface;
switching the unmanned vehicle between the surface traverse configuration and the flight configuration;
disengaging the plurality of drive mechanisms from the surface;
propelling the unmanned vehicle through air to avoid the obstacle;
engaging the surface with the plurality of drive mechanisms;
switching the unmanned vehicle between the flight configuration and the surface traverse configuration; and
propelling the unmanned vehicle along the surface using the surface propulsion system.

18. The method according to claim 15, wherein the flight propulsion system and the surface propulsion system are controllable by a user via manual control or by a controller via, at least partially, autonomous control.

* * * * *

UNITED STATES PATENT AND TRADEMARK OFFICE
CERTIFICATE OF CORRECTION

| | | |
|---|---|---|
| PATENT NO. | : 12,296,994 B2 | Page 1 of 1 |
| APPLICATION NO. | : 18/370772 | |
| DATED | : May 13, 2025 | |
| INVENTOR(S) | : Genda Chen et al. | |

It is certified that error appears in the above-identified patent and that said Letters Patent is hereby corrected as shown below:

On the Title Page

In item (73), in Assignees, delete "The Curators of the University of Missouri, Columbia, MO (US)" and insert therefor -- The Curators of the University of Missouri, Columbia, MO (US); The Hong Kong Polytechnic University, Kowloon (HK) --.

Signed and Sealed this
Twenty-third Day of December, 2025

John A. Squires
*Director of the United States Patent and Trademark Office*